(12) United States Patent
Moon

(10) Patent No.: US 8,835,810 B2
(45) Date of Patent: Sep. 16, 2014

(54) SYSTEM AND METHOD FOR A PROGRAMMABLE COUNTER-TOP ELECTRIC DEHYDRATOR

(75) Inventor: Jung S. Moon, Buffalo Grove, IL (US)

(73) Assignee: Nuwave LLC, Libertyville, IL (US)

(*) Notice: Subject to any disclaimer, the term of this patent is extended or adjusted under 35 U.S.C. 154(b) by 1101 days.

(21) Appl. No.: 12/506,628

(22) Filed: Jul. 21, 2009

(65) Prior Publication Data

US 2009/0321410 A1 Dec. 31, 2009

Related U.S. Application Data

(63) Continuation-in-part of application No. 11/987,487, filed on Nov. 30, 2007, now Pat. No. 7,964,824.

(51) Int. Cl.
*A21B 3/04* (2006.01)
*A21B 1/00* (2006.01)
*F26B 9/00* (2006.01)
*A21B 1/22* (2006.01)

(52) U.S. Cl.
CPC ... *A21B 1/22* (2013.01); *A21B 3/04* (2013.01); *F26B 9/003* (2013.01)
USPC .......................... 219/386; 219/400; 219/392

(58) Field of Classification Search
USPC ......... 219/385, 386, 395, 400, 402, 411, 440, 219/490, 492, 497, 501, 502, 506; 99/325, 99/330, 446, 447
See application file for complete search history.

(56) References Cited

U.S. PATENT DOCUMENTS

| | | |
|---|---|---|
| 2,274,325 A | 2/1942 | Ford |
| 2,654,824 A | 10/1953 | Schroeder |
| 2,848,592 A | 8/1958 | Mergen |
| 2,864,932 A | 12/1958 | Forrer |
| 2,893,307 A | 7/1959 | Rodriguez |
| 3,281,575 A | 10/1966 | Ferguson, Jr. |
| D212,820 S | 11/1968 | Benes |
| 3,851,639 A | 12/1974 | Beddoe |

(Continued)

FOREIGN PATENT DOCUMENTS

| | | |
|---|---|---|
| KR | 1996-0002662 | 3/1996 |
| WO | WO-2009070338 | 6/2009 |

OTHER PUBLICATIONS

Notification of the International Search Report and the Written Opinion of the International Searching Authority, International Search Report and Written Opinon, Mailing date Feb. 5, 2009.

(Continued)

*Primary Examiner* — Brian Jennison
(74) *Attorney, Agent, or Firm* — Jeffrey Cikalo; ATFirm PLLC; Ralph P. Albrecht

(57) ABSTRACT

A system and method directed to a dehydrating device, which may include a dehydrating enclosure and an adapter. The adapter may be operable to couple the dehydrating enclosure to a power unit, which may include a power source disposed inside the power unit, and a control source operable to control the power source. The power unit may be detachably couplable to at least one of the dehydrating enclosure or a cooking enclosure. The power unit and the cooking enclosure may collectively combine into a multi-stage counter-top electric oven. The power unit and the dehydrating enclosure may also collectively combine into a dehydrator. The dehydrating enclosure may include a plurality of stackable dehydrating trays through which dehydrating air is circulated from the power unit.

25 Claims, 28 Drawing Sheets

(56) References Cited

U.S. PATENT DOCUMENTS

| | | |
|---|---|---|
| 3,882,767 A | 5/1975 | Oyler et al. |
| 4,350,874 A | 9/1982 | Nishikawa |
| 4,625,097 A | 11/1986 | Miwa |
| 4,629,850 A | 12/1986 | Tanabe |
| 4,663,517 A | 5/1987 | Huff et al. |
| 4,756,091 A | 7/1988 | Van Denend |
| 4,817,509 A | 4/1989 | Erickson |
| 4,870,255 A | 9/1989 | Fujii |
| 4,913,047 A | 4/1990 | Burley |
| D313,679 S | 1/1991 | Sakamoto |
| 5,045,671 A | 9/1991 | Kanaya et al. |
| 5,097,112 A | 3/1992 | Kanaya et al. |
| 5,107,097 A | 4/1992 | Negandhi et al. |
| D328,834 S | 8/1992 | Chang |
| 5,157,239 A | 10/1992 | Kanaya et al. |
| 5,165,328 A | 11/1992 | Erickson et al. |
| 5,217,545 A | 6/1993 | Smith et al. |
| D344,873 S | 3/1994 | Chang |
| 5,329,919 A | 7/1994 | Chang |
| 5,338,616 A | 8/1994 | Ishii et al. |
| D350,449 S | 9/1994 | Kaneko |
| 5,404,420 A | 4/1995 | Song |
| D358,963 S | 6/1995 | Kaneko |
| 5,423,249 A | 6/1995 | Meyer |
| 5,437,108 A | 8/1995 | Alseth |
| D364,308 S | 11/1995 | Chang |
| 5,465,651 A | 11/1995 | Erickson et al. |
| 5,466,912 A | 11/1995 | Dornbush et al. |
| 5,485,780 A | 1/1996 | Koether et al. |
| D367,396 S | 2/1996 | Hsu |
| D369,274 S | 4/1996 | Dornbush et al. |
| D369,514 S | 5/1996 | Baldwin |
| 5,513,558 A | 5/1996 | Erickson et al. |
| 5,520,096 A | 5/1996 | Dornbush et al. |
| 5,534,681 A | 7/1996 | Hwang |
| 5,548,102 A | 8/1996 | Kwon |
| 5,598,769 A | 2/1997 | Luebke et al. |
| 5,699,722 A | 12/1997 | Erickson et al. |
| 5,735,190 A | 4/1998 | Sham |
| 5,747,781 A | 5/1998 | Kim et al. |
| 5,793,023 A | 8/1998 | Hong et al. |
| 5,801,357 A | 9/1998 | Danen |
| 5,801,362 A | 9/1998 | Pearlman et al. |
| 5,845,563 A | 12/1998 | Haring et al. |
| 5,877,477 A | 3/1999 | Petty et al. |
| 5,878,508 A | 3/1999 | Knoll et al. |
| 5,880,436 A | 3/1999 | Keogh |
| 5,974,957 A | 11/1999 | Ysen |
| 6,018,146 A | 1/2000 | Uzgiris et al. |
| D424,862 S | 5/2000 | Holbrook |
| 6,069,345 A | 5/2000 | Westerberg |
| 6,085,442 A | 7/2000 | Erickson |
| 6,093,918 A | 7/2000 | Sohn |
| 6,093,919 A | 7/2000 | Seo et al. |
| 6,127,666 A | 10/2000 | Sohn |
| 6,172,347 B1 | 1/2001 | Lee |
| 6,201,217 B1 | 3/2001 | Moon et al. |
| 6,255,630 B1 | 7/2001 | Barnes et al. |
| 6,316,757 B1 | 11/2001 | Kim et al. |
| 6,363,836 B1 | 4/2002 | Usherovich |
| 6,448,540 B1 | 9/2002 | Braunisch et al. |
| 6,502,265 B2 | 1/2003 | Blair et al. |
| D469,657 S | 2/2003 | Becker et al. |
| 6,521,870 B2 | 2/2003 | Graves et al. |
| 6,617,554 B2 | 9/2003 | Moon et al. |
| D487,670 S | 3/2004 | Moon et al. |
| D490,648 S | 6/2004 | Moon et al. |
| 6,747,250 B1 * | 6/2004 | Cha ............................... 219/400 |
| 6,809,301 B1 | 10/2004 | McIntyre et al. |
| 6,917,016 B2 | 7/2005 | Baecker et al. |
| 6,917,017 B2 | 7/2005 | Moon et al. |
| 6,936,795 B1 | 8/2005 | Moon et al. |
| 6,940,049 B2 | 9/2005 | Harwell et al. |
| 6,967,314 B2 | 11/2005 | Sauter et al. |
| 7,012,220 B2 | 3/2006 | Boyer et al. |
| 7,159,510 B2 | 1/2007 | Lamaster et al. |
| 7,323,663 B2 | 1/2008 | Cavada et al. |
| 7,348,521 B2 | 3/2008 | Lee et al. |
| 7,360,533 B2 | 4/2008 | Mcfadden |
| 7,487,716 B2 | 2/2009 | Swank et al. |
| 7,619,186 B2 | 11/2009 | Cavada et al. |
| 2003/0062360 A1 * | 4/2003 | Moon et al. .................... 219/481 |
| 2005/0172835 A1 | 8/2005 | Lamaster et al. |
| 2006/0225580 A1 | 10/2006 | Fernandez et al. |
| 2007/0221663 A1 * | 9/2007 | Brooks et al. ................. 219/544 |
| 2009/0025248 A1 | 1/2009 | Lannon |

OTHER PUBLICATIONS

Hearthware's LPR 2.2 Initial Infringement Contentions—Oct. 28, 2009.

Morningware's LPR 2.3 Initial Invalidity, Noninfr. and Unenf. Contentions—Nov. 9, 2009.

Hearthware's initial Response to Invalidity Contentions Pursuant to LPR 2.5—Jan. 22, 2010.

DI 107, 107a, 107b, and 107c—Hearthware's First Amended Counterclaims including exhibits A, B, and C—Feb. 11, 2010.

DI 125 and DI 125a—Morningware's Supplemental Answer to Hearthware's First Amended Counterclaims and Exhibit—Apr. 29, 2010.

Morningware's LPR 3.1 Final Invalidity and Unenf. Contentions—Jul. 6, 2010.

Hearthware's LPR 3.1 Amended and Final Infringement Contentions—Jul. 6, 2010.

Memorandum in Support of Morningware's Motion to Strike Hearthware Home Products LPR 3.1 Final Infringement Contentions and Dismiss Hearthware's Infringement Claims—Jul. 21, 2010.

Morningware's LPR 3.2 Final Non-Infringement Contentions—Aug. 3, 2010.

Hearthware's Opposition to Morningware's Motion to Strike Hearthware's LPR 3.1 Final Infringement Contentions—Aug. 16, 2010.

Morningware's Reply to Hearthware's Opposition to Morningware's Motion to Strike Hearthware's LPR 3.1 Final Infringement Contentions—Aug. 30, 2010.

Hearthware's Response to Morningware's Invalidity Contentions Pursuant to LPR 3.2—Aug. 3, 2010.

Morningware's Opening Claim Construction Brief and Exhibits A, B, C & D—Under LRP 4.2—Sep. 22, 2010.

Hearthware's Claim Construction Brief Under LPR 4.2 and Appendix E—Oct. 20, 2010.

DI 144—Plaintiff's Counterdefendant Morningware, Inc.'s Reply Claim Construction Brief on U.S. Patent No. 6,201,217 Pursuant to LPR 4.2(D)—Nov. 3, 2010.

DI 134-1—Joint Claim Construction Chart—Sep. 8, 2010.

Final Joint Claim Construction Chart—Nov. 10, 2010.

DI 163—Markman Memorandum Opinion and Order, Hon. J. St. Eve—Feb. 23, 2011.

\* cited by examiner

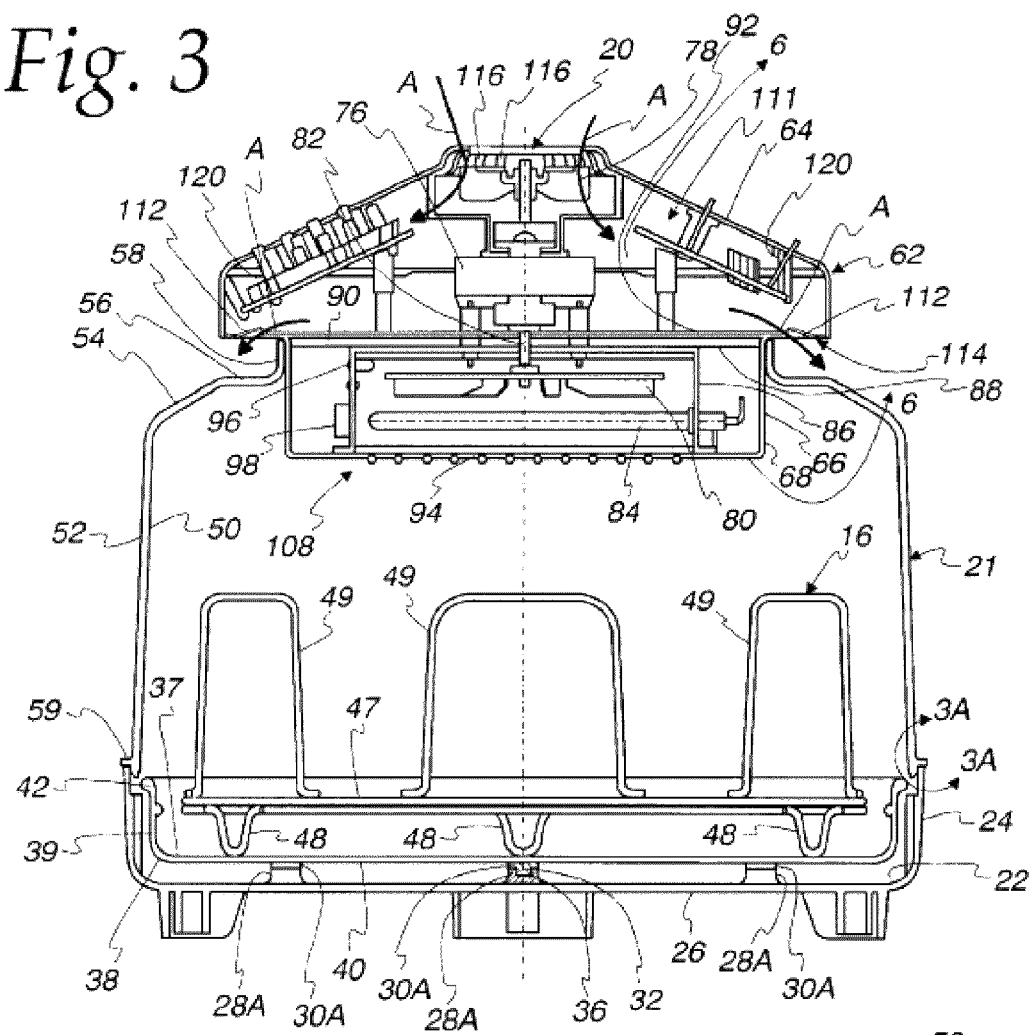
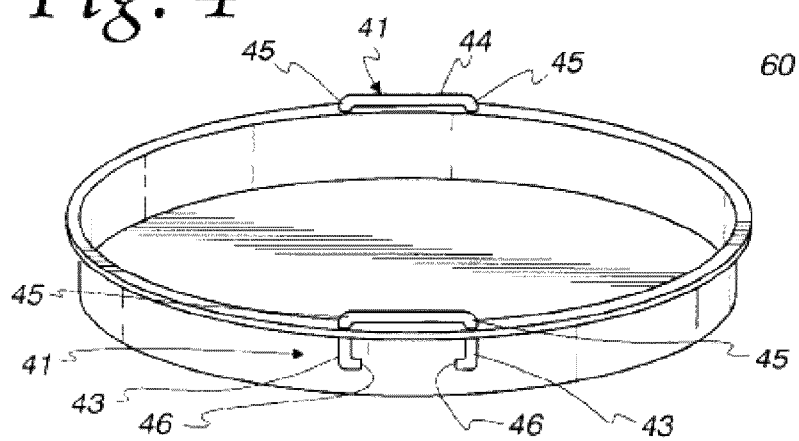
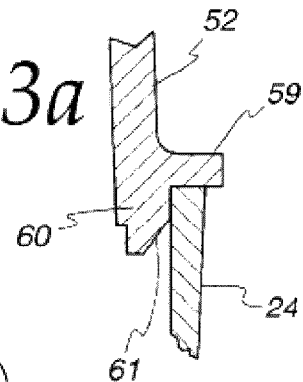

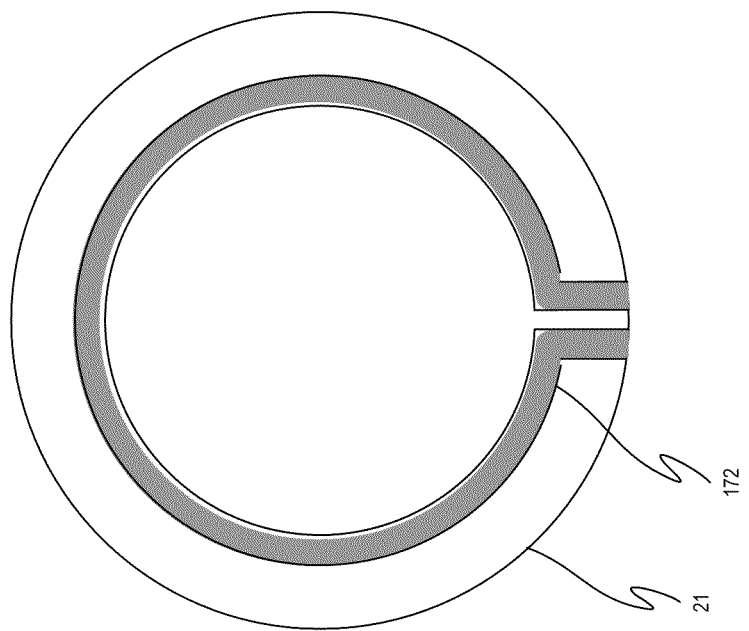
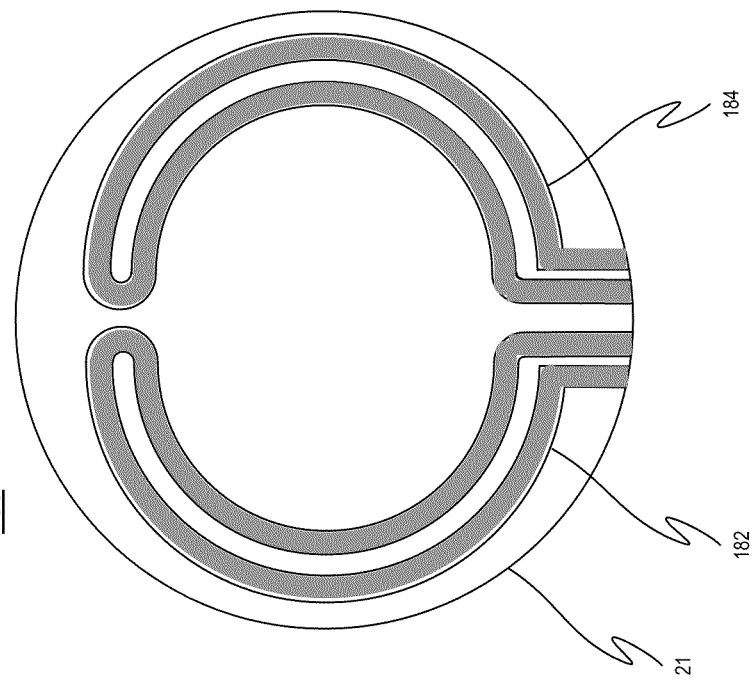

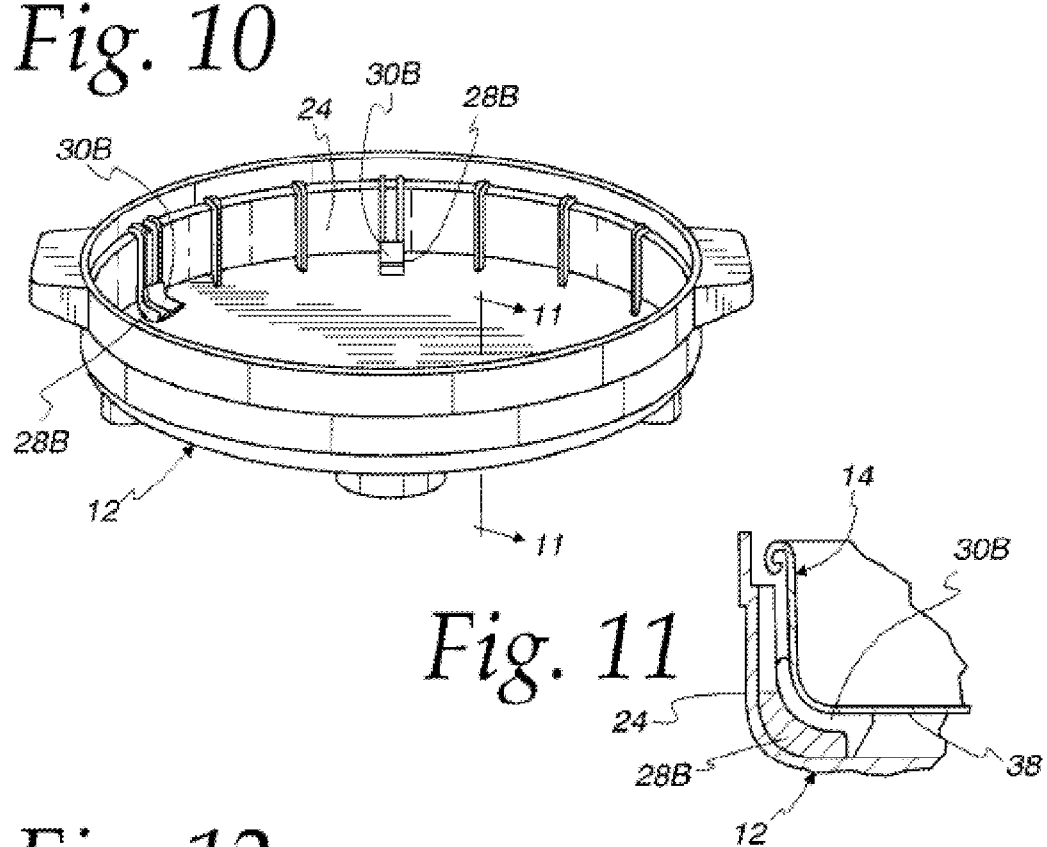
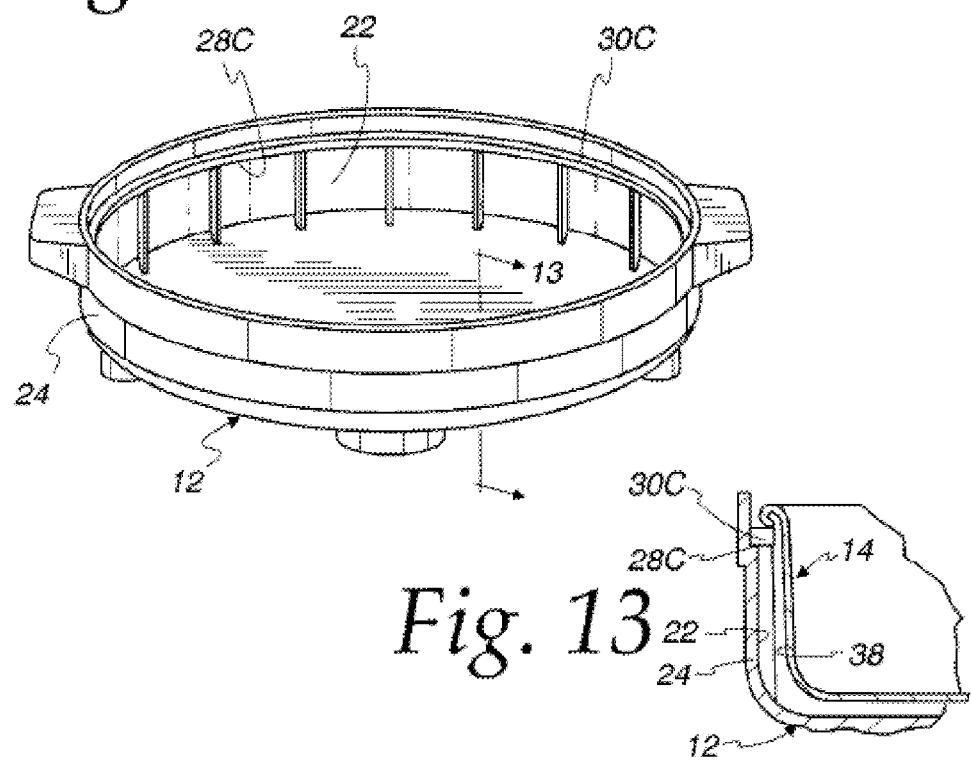

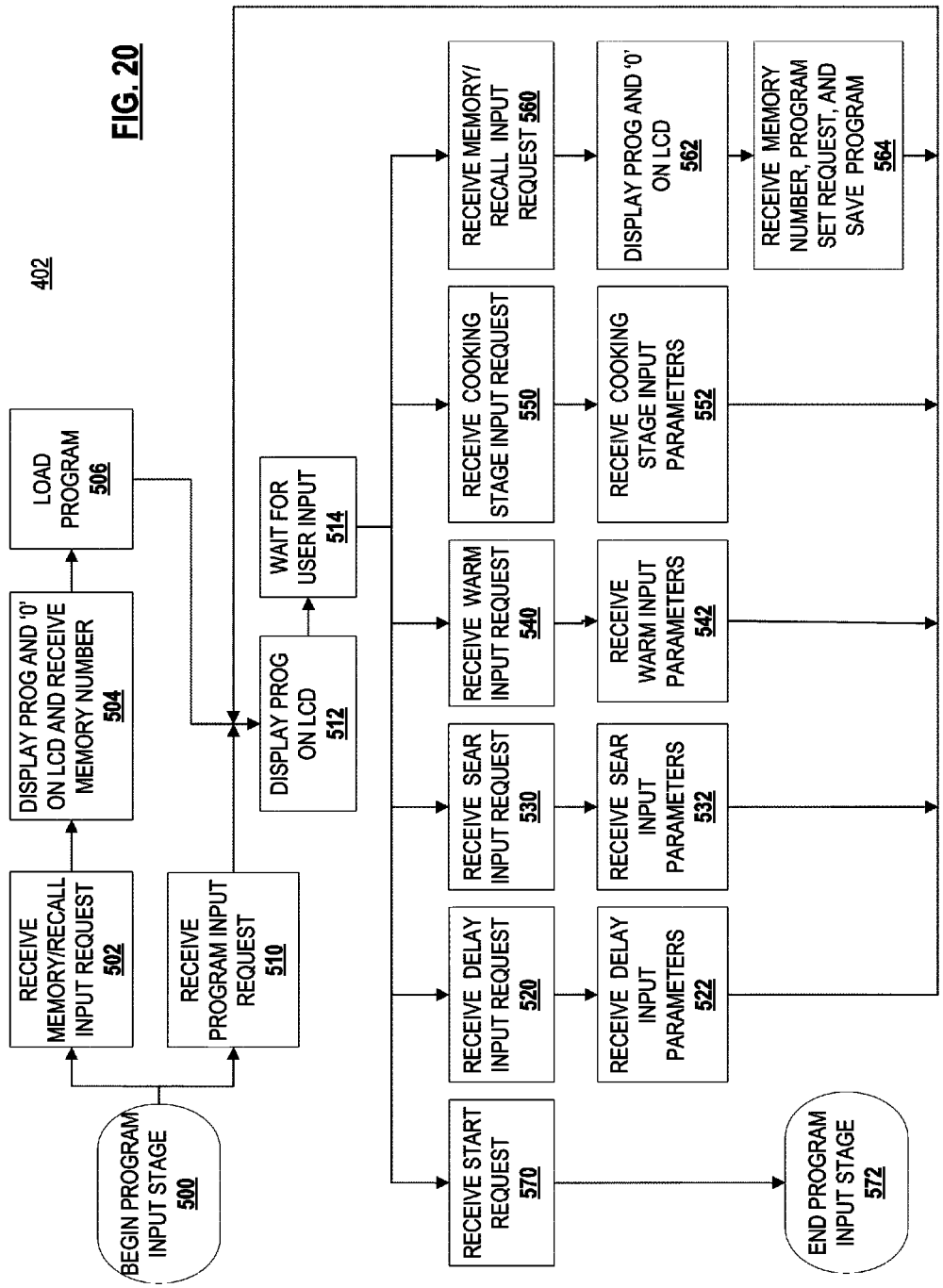

SYSTEM AND METHOD FOR A PROGRAMMABLE COUNTER-TOP ELECTRIC DEHYDRATOR

CROSS REFERENCE TO RELATED APPLICATIONS

The present invention is a continuation-in-part of U.S. patent application Ser. No. 11/987,487, entitled "System, Method and Computer Program Product for Programmable Counter-top Electric Oven," to Moon, filed Nov. 30, 2007, the contents of which are incorporated herein by reference in their entireties.

BACKGROUND

1. Field

The present invention relates generally to dehydrators, and more particularly to a food dehydrator.

2. Related Art

Dehydrating food is well known in the art. Recently, mechanical dehydrators have been developed for use in the home. However, conventional dehydrators are limited in their utility because they are designed to dehydrate food, not cook food like an oven. An exemplary counter-top oven is described in U.S. Pat. No. 6,201,217 to Moon, et al., of common assignee to the present invention, the contents of which are incorporated herein by reference in their entirety. Although, conventional counter-top ovens heat food, it is not practical to dehydrate food in a conventional counter-top oven for numerous reasons including safety, quality and efficiency. What is needed is a dehydrator that overcomes shortcomings of conventional dehydrators.

SUMMARY OF THE INVENTION

The present invention sets forth various exemplary embodiments of apparatuses, systems, and methods for dehydrating.

An exemplary embodiment of the present invention sets forth a power unit for cooking or dehydrating. The power unit may include a power source disposed inside the power unit and a control source operable to control the power source. The power unit may also be detachably couplable to a cooking enclosure and a dehydrating enclosure.

In accordance with an exemplary embodiment, the power unit may be a power head. In an exemplary embodiment, the power source may include a heating unit and a fan unit.

According to an exemplary embodiment, the heating unit may include a heating element operable to provide heat to an enclosure, the enclosure comprising any one of the cooking enclosure and the dehydrating enclosure; and a thermostat system operable to measure an internal temperature of the enclosure and provide an input thereof to the control source.

In an exemplary embodiment, the thermostat system may include a thermister operable to measure the internal temperature of the enclosure and a thermostat adjustable to set a desired temperature of the enclosure.

According to an exemplary embodiment, the fan unit may include a fan chamber and a fan mounted in the fan chamber operable to create a dehydrating air flow throughout any one of: the cooking enclosure and the dehydrating enclosure.

In an exemplary embodiment, the control source may include a sensor operable to determine whether the power unit is coupled to the cooking enclosure or the dehydrating enclosure.

According to an exemplary embodiment, the control source limits a maximum desired temperature of the dehydrating enclosure when the power unit is coupled with the dehydrating enclosure.

In an exemplary embodiment, the sensor may include a switch with a first activation status when the power unit is coupled with the heating enclosure and a second activation status when the power unit is coupled with the dehydrating enclosure.

According to an exemplary embodiment, the switch may include a stand coupled to the power unit, an actuator sensor coupled to the stand, and an actuator coupled to the stand to trigger the actuator sensor depending on whether the cooking enclosure or the dehydrating enclosure is coupled to the power unit.

In an exemplary embodiment, the power unit may be coupled to the cooking enclosure and the control source may include an input interface operable to receive a multi-stage cooking recipe, a storage device operable to store the multi-stage cooking recipe, and a processor operable to cause the power source to execute the multi-stage cooking recipe.

According to an exemplary embodiment, the power unit and the cooking enclosure may collectively comprise a multi-stage counter-top electric oven.

In an exemplary embodiment, the power unit and the dehydrating enclosure may collectively comprise a dehydrator.

In an exemplary embodiment, the control source may include an input interface operable to receive a multi-stage dehydration process, a storage device operable to store the multi-stage dehydration process, and a processor operable to cause the power source to execute the multi-stage dehydration process.

According to an exemplary embodiment, the control source may be operable to notify a user to change the position of at least one dehydrating tray comprising the dehydrating enclosure.

Another exemplary embodiment of the present invention sets forth a dehydrating unit. According to an exemplary embodiment, a dehydrating unit may include a dehydrating enclosure and a power unit. The power unit may include a power source disposed inside the power unit and a control source operable to control the power source. The power unit may be detachably couplable to: the dehydrating enclosure and a cooking enclosure.

In an exemplary embodiment, the dehydrating unit may also include an adapter operable to detachably couple the power unit and the dehydrating enclosure.

Another exemplary embodiment of the present invention sets forth a dehydrating device. A dehydrating device may include a dehydrating enclosure and an adapter operable to couple the dehydrating enclosure to a power unit. The power unit may include a power source disposed inside the power unit and a control source operable to control the power source. The power unit may be detachably couplable to: the dehydrating enclosure and a cooking enclosure.

In an exemplary embodiment, the dehydrating enclosure may include at least one dehydrating tray.

According to an exemplary embodiment the dehydrating tray may include: a substantially radial raised outer wall, the wall forming a plurality of openings on the top portion thereof, the wall comprising a plurality of latches on the bottom portion thereof, the latches operable to couple with one or more openings on the top portion of a second dehydrating tray positioned on the bottom of the dehydrating tray.

In an exemplary embodiment, the dehydrating tray may form a substantially radial raised inner ring positioned in a center portion of the outer wall, the inner ring being fixedly and detachably mountable to a second dehydrating tray positioned on top thereof.

According to an exemplary embodiment, the inner ring comprises a substantially vertical wall forming one or more spaces circulating dehydrating air between a central portion of the dehydrating tray and an orifice defined by the substantially vertical wall and through which orifice dehydrating air is blown downward from the power unit.

In an exemplary embodiment, the dehydrating tray may include a substantially flat inner loop portion coupling the radial raised outer wall to the radial raised inner ring, the flat inner loop portion including a plurality of surfaces having openings therebetween.

According to an exemplary embodiment, the dehydrating enclosure may further comprise one or more additional dehydrating trays respectively stacked on top of one another and said at least one dehydrating tray.

A exemplary embodiment of the present invention sets forth a production process. The process may include producing a dehydrating enclosure and combining the dehydrating enclosure with a power unit. The power unit may include a power source disposed inside the power unit and a control source operable to control the power source. The power unit may be detachably couplable to: the dehydrating enclosure and a cooking enclosure.

A exemplary embodiment of the present invention sets forth another production process. The process may include producing a power unit and combining the power unit with a dehydrating enclosure. The power unit may include a power source disposed inside the power unit and a control source operable to control the power source. The power unit may be detachably couplable to: the dehydrating enclosure and a cooking enclosure.

In an exemplary embodiment, the control source of the power unit may set one or more temperature settings devised for removal of bacteria without elimination of vital enzymes. The temperature settings may include at least one of: 106° F., 116° F., 150° F., 175° F., 225° F., 250° F., 275° F., 300° F., 325° F., or 350° F.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of various exemplary embodiments, including a preferred embodiment of the invention, as illustrated in the accompanying drawings wherein like reference numbers generally indicate identical, functionally similar, and/or structurally similar elements.

FIG. 3 depicts an exemplary embodiment of a section view of the oven shown in FIG. 1, according to an exemplary embodiment of the present invention;

FIG. 3A depicts an exemplary embodiment of an enlarged view of the area indicated by lines 3A-3A in FIG. 3, according to an exemplary embodiment of the present invention;

FIG. 4 depicts an exemplary embodiment of a perspective view of an oven pan of the oven shown in FIG. 1, according to an exemplary embodiment of the present invention;

FIGS. 8A-B depicts exemplary embodiments of heat element arrangements, according to an exemplary embodiment of the present invention;

FIG. 10 depicts an exemplary embodiment of a perspective view of an optional embodiment of a base for the oven shown in FIG. 1, according to an exemplary embodiment of the present invention;

FIG. 11 depicts an exemplary embodiment of an enlarged, fragmentary section view taken substantially along line 11-11 in FIG. 10, according to an exemplary embodiment of the present invention;

FIG. 12 depicts an exemplary embodiment of a perspective view of another optional embodiment of a base 10 for the oven shown in FIG. 1, according to an exemplary embodiment of the present invention;

FIG. 13 depicts an exemplary embodiment of an enlarged, fragmentary section view taken substantially along line 13-13 in FIG. 12, according to an exemplary embodiment of the present invention;

FIG. 20 depicts an exemplary flowchart of an exemplary way exemplary delay stage, sear stage and warm stage input parameters of a multi-stage cooking recipe may be received;

DETAILED DESCRIPTION OF EXEMPLARY EMBODIMENTS OF THE PRESENT INVENTION

A preferred and various other exemplary embodiments of the invention are discussed in detail below. While specific exemplary embodiments are discussed, it should be understood that this is done for illustration purposes only. A person skilled in the relevant art will recognize that other components and configurations can be used without parting from the spirit and scope of the invention.

An exemplary counter-top electric oven is described herein with reference to the accompanying drawings in accordance to an exemplary embodiment of the invention. However, it should be understood that many features of the invention may find utility in other types of counter-top electric cooking ovens, including those using cyclonic air flow in combination with simple resistance electric heating elements. Accordingly, no limitation is intended to use in connection with an infrared heating element except insofar as expressly stated in the appended claims.

Figure 1:
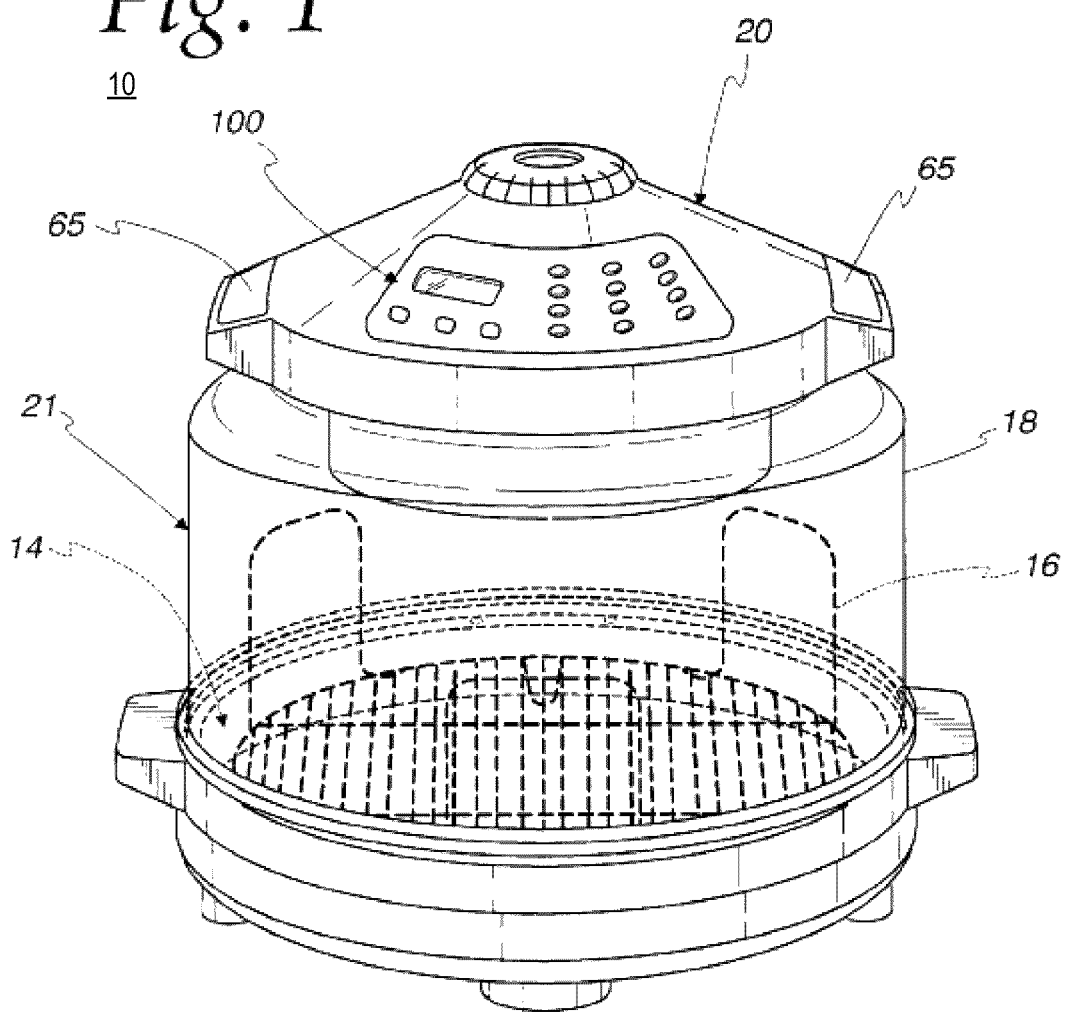
FIG. 1 depicts an exemplary embodiment of a perspective view of a counter-top infrared electric oven, according to an exemplary embodiment of the present invention.
Figure 2:
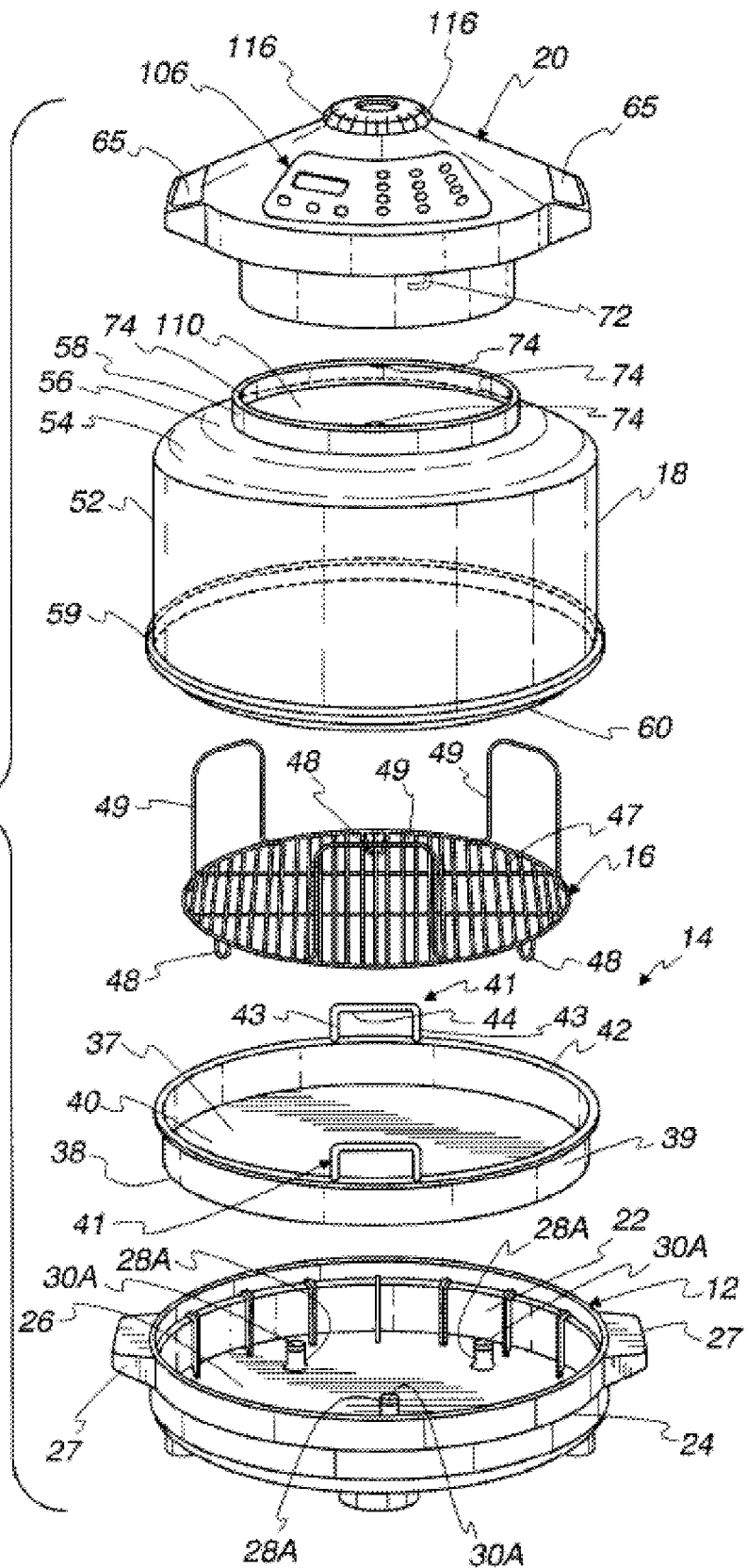
FIG. 2 depicts an exemplary embodiment of an exploded view of the oven shown in FIG. 1, according to an exemplary embodiment of the present invention.

Referring to FIGS. 1 and 2, an exemplary embodiment of a counter-top electric oven 10 may include a base 12, an oven pan 14 supported by the base 12, a cooking rack 16 supported by the oven pan 14, an oven housing 18, which may be cylindrical and transparent and may be supported by the base 12, and a power head 20 with handles 65 supported on the oven housing 18 and may be detachably coupled to the oven 10. Together, the oven pan and the oven housing 18 may define an exemplary cooking enclosure 21 with the oven 10 as in the assembled state shown in FIG. 1.

According to an exemplary embodiment of the invention, as shown in FIGS. 2 and 3, the base 12 may have an interior surface 22 defined by a generally cylindrical side wall 24 and a planar bottom 26. In an exemplary embodiment, a pair of handles 27 may extend from the cylindrical side wall 24 to allow a user to move the oven from one location to another. According to an exemplary embodiment, the interior surface 22 may surround the oven pan 14 and may be spaced from the oven pan 14 by an air gap. The base 12 may further include one or more supports 28A, 28B, 28C (collectively 28) for the oven pan 14 and one or more thermal insulators 30 between the one or more supports 28 and the oven pan 14 to prevent overheating of the base 12 by the heat from the oven pan 14. In an exemplary embodiment shown in FIGS. 2 and 3, the one or more supports 28 may be provided in the form of three cylindrical pillars 28A, and the one or more thermal insulating spacers 30 may be provided in the form of three cylindrical spacers 30A, each supported by one of the pillars 28A. As seen in the section view of the spacer 30A and pillar 28A in FIG. 3, each of the spacers 30A, 30B, 30C (collectively 30) may include a cylindrical stub 32 that is engaged in a mating hole 36 in each pillar 28A to retain each of the spacers 30A to the respective pillar 28A. While the cross-sections of the spacers 30A and the pillars 28A may be generally circular, non-circular cross-sections, such as, e.g., but not limited to, triangular, oval, square, rectangular, trapezoidal, hexagonal, etc., may also be contemplated according to embodiments of the invention. According to an exemplary embodiment, the oven pan 14 may be supported on the insulators 30 to maintain the air gap between the interior surface 22 and the cooking pan 14 and to prevent overheating of the base 12, including the handles 27. In an exemplary embodiment, the plastic base 12 may be made from a polycarbonate material and the thermal insulators 30 may be made from a silicone rubber insulating material.

In an exemplary embodiment, the metallic oven pan 14 may include an interior surface 37 and an exterior surface 38 defined by a cylindrical side wall 39 and a planar bottom 40. According to an exemplary embodiment, the oven pan 14 may be a one piece construction made of aluminum plate with a nonstick polytetrafluoroethylene (PTFE) coating on the interior surface 37. According to an exemplary embodiment, a pair of retractable handles 41 may be mounted to a lip 42 that defines an outer periphery of the oven pan 14. The handles 41 may be mounted to the lip 42 for movement between a first position, shown in FIG. 2, where the handles 41 are extended from the lip 42 so that a user may grasp the handles 41 to remove the pan 14 from the base 12, and a second position, shown in FIG. 4, where the handles 41 are retracted toward lip 42 to allow the oven housing 18 to be positioned above the oven pan 14, as shown in FIG. 3, without interfering with the handles 41. In an exemplary embodiment as shown in FIG. 4, each of the handles 41 may have a pair of legs 43 extending from a grasping member 44. In an exemplary embodiment, each of the legs 43 may be received in a vertical guide hole 45 formed in the lip 42 to guide the handles 41 between the first and second positions. Each of the legs may terminate in a tab 46 that engages the lip 42 with the handle 41 in the first position. According to an exemplary embodiment, the handles may be made from a unitary piece of metallic wire that is bent to form the grasping member, the legs 43, and the tabs 46.

According to an exemplary embodiment, the cooking rack 16 may include a planar grid 47 for supporting objects that are being cooked, a first set of loop projections 48 extending in one direction from the plane of the grid 47 and a second set of loop projections 49 extending in the opposite direction from the plane of the grid 47. In an exemplary embodiment, the projections 48 may be used to support the grid to provide a first cooking height for objects supported by the grid 47, while the projections 49 may be used to support the grid 47 to provide a second cooking height for the grid 47. According to an exemplary embodiment, the cooking rack 16 may be made from Grade 304 stainless steel with a non-stick PTFE coating.

In the embodiment as shown in FIG. 3, an exemplary embodiment of an oven housing 18 may include an interior surface 50 defined by a generally cylindrical side wall 52 that blends into a generally conical shaped side wall 54 which in turn blends into a planar upper wall 56 which finally blends into a generally cylindrical ring 58. An annular lip 59 may be formed on the outer surface of the wall 52 and serves to support the oven housing 18 on the side wall 24 of the base 12. A portion 60 of the wall 52 may extend below the lip 59 and may cooperate with the side wall 24 of the base 12 to restrict the leakage of hot gases, such as steam, from the cooking enclosure 21. In the embodiment as shown in FIG. 3A, the portion 60 may include an annular lead-in chamfer or relief 61 that serves to guide the portion 60 into the base 12, thereby easing the engagement of the oven housing 18 to the base 12 and preventing the mislocation of the housing 18 relative to the base 12. According to an exemplary embodiment, the oven housing 18 may be formed from a transparent polycarbonate material. The relief 61 may allow for the portion 60 to be flexibly inserted into the base 12 without precise vertical movement of the housing 18 relative to the base 12, such that the housing 18 can be inserted into the base 12 without having a perfect perpendicular angle relative to the base 12.

Figure 5:
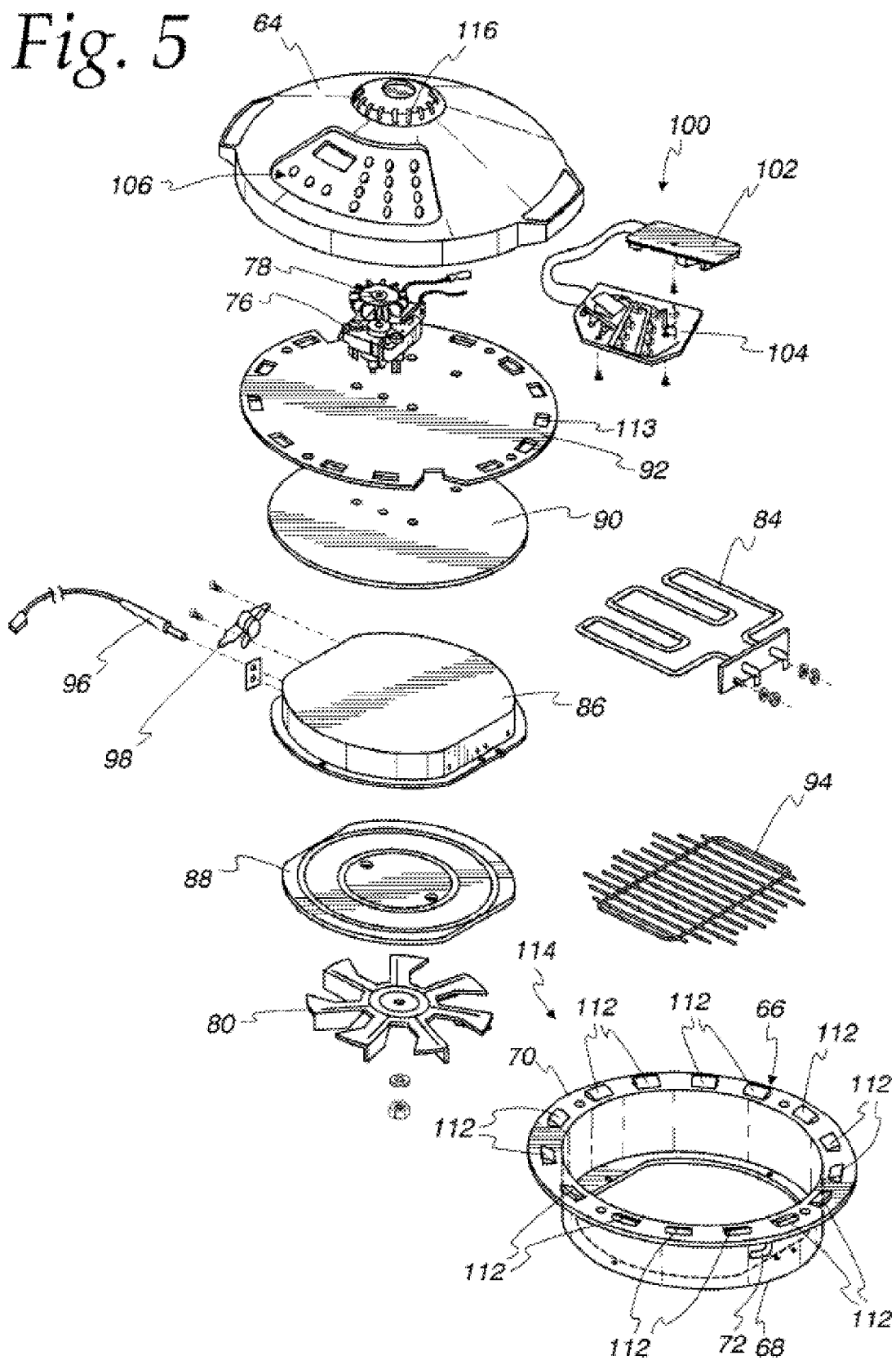
FIG. 5 depicts an exemplary embodiment of an exploded view of a power head of the oven shown in FIG. 1, according to an exemplary embodiment of the present invention.

In the embodiment as shown in FIGS. 3 and 5, the power head 20 may include exterior housing assembly 62. According to an exemplary embodiment, the assembly 62 may include a domed shape upper housing 64 having a pair of handles, and a lower housing 66 including a cylindrical wall portion and an annular flange 70. As seen in FIG. 2, according to an exemplary embodiment, four equally spaced lands 72 (only one shown) may be raised from the cylindrical wall 66 to engage a plurality of ramped tabs 74 formed on the ring 58 of the housing 18 to detachably couple the power head 20 and the housing 18. The power head 20 may further include a motor 76 for driving a cooling fan 78 and an oven fan 80 via a common shaft 82, an infrared electric heating element 84, a heater/fan housing 86, a radiation plate 88 mounted to an interior surface of the heater housing 86, a glass fiber thermal insulator 90 mounted between the heater housing 86 and the motor 76, a mica sheet 92 mounted between the upper housing 64 and the lower housing 66, a protective grid 94, a thermistor 96, a thermostat 98, and a control system 100 including a pair of control boards 102 and 104 for controlling the heating element 84 and the motor 76 in response to signals from the thermistor 96 and command signals input from an input interface 106 by a user. According to an exemplary embodiment, the fan 78 may be made of a plastic material, while the fan 80 and the radiation plate 88 may be made of aluminum plate in order to reflect the infrared energy from the heater 84 down toward the interior of the cooking enclosure 21. According to an exemplary embodiment, the motor 76 may drive the fans 78 and 80 at a speed in the range of 2500 rpm, which should provide an adequate air flow from the fan 80 to create a relatively even temperature throughout the cooking enclosure 21 and to speed the cooking of food by convection to supplement the infrared cooking, without generating the high speed air motion associated with some cyclonic electric counter-top ovens. The relatively low speed air flow created by the fan 80 may also provide another benefit in that it may help to maintain the hot surfaces of the oven 10 in a temperature range that may tend to emit infrared radiation and limit the reduction in emissivity of the non-metal materials of the oven 10. In an exemplary embodiment, the heating element 84 may be made of an incoloy 840 material coated with a G-1500 (CRC 1500) ceramic coating having a coating thickness of 20.+−.5 μm, with the main components of the coating material being $SiO_2$, $TiO_2$, and $Al_2O_3$, with an inorganic pigment, mainly Si—O. The ceramic coating may increase the emissive power of the heating element and shift the emission spectrum to the infrared range. With this coating, the heating element 84 may be capable of generating approximately 98% or more of its heat radiation in the infrared range. A sol-gel coating method may be used for coating the ceramic material firmly onto the incoloy 840 material. Infrared electric heating elements of this construction have been used in the past on hair dryers, bread makers, etc. The grid 94 may be made of 304 stainless steel or from a PTFE coated metallic material. According to an exemplary embodiment, the upper housing 64 may be made from a polycarbonate material and the lower housing and the heater housing may be made from zinc plated steel or steel coated with a non-stick PTFE coating.

Together, the cylindrical wall portion 68 of the lower housing 66, the heater housing 86, the radiation plate 88, the fan 80, and the heating element 84 may define an exemplary heating unit 108 that may extend into the cooking enclosure 21 through an opening 110 defined by the cylindrical portion 58 of the housing 18. Together, the upper housing 64 and the mica sheet 92 may define an exemplary fan chamber 111 that may be thermally insulated from the interior of the cooking enclosure 21 by the mica sheet 92, the glass fiber insulator 90, the heater housing 86, the radiation plate 88, and the lower housing 66. In an exemplary embodiment as shown in FIGS. 3 and 5, a plurality of cooling air outlets 112 may form in the annular flange 70 of the lower housing 66. Cut-outs 113 may be provided in the mica sheet 92 to prevent interference between the outlets 112 and the mica sheet 92 and to allow a cooling air flow to pass through the mica sheet 92 to the outlets 112. The outlets 112 may be equally circumferentially spaced around the flange 70.

Together the flange 70 and the outlets 112 may define an exemplary cooling manifold 114 that surrounds the opening 110 of the housing 18 and faces the surface 56 outside of the cooking enclosure 21. The cooling fan 78 may actively cool the fan chamber 111 and the walls 52, 54, 56 and 58 of the housing 18 by drawing a cooling air flow through a plurality of inlet openings 116 formed in the upper housing 64 and forcing the cooling air to exit through the outlets 112, which direct the cooling air flow toward the surface 56 of the housing 18 to cool the housing 18, as indicated by arrows A.

Figure 6:
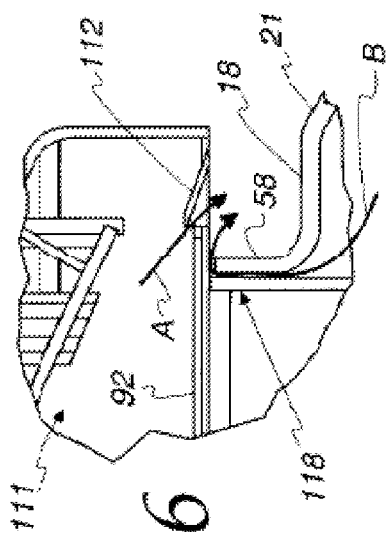
FIG. 6 depicts an exemplary embodiment of an enlarged view of the area indicated by lines 6-6 in FIG. 3, according to an exemplary embodiment of the present invention.

In the embodiment as shown in FIG. 6, the wall 68 and the flange 70 may be spaced from the cylindrical ring 58 of the housing 18 by the tabs 74 to define an exemplary hot gas vent 118 that surrounds the heating unit 108 between the heating unit 108 and the outlets 112 to vent hot gas, such as steam, from the inside of the cooking enclosure 21 for mixture with the cooling air flow from the air outlets 112, as shown by the arrow B.

According to an exemplary embodiment, the control boards 102 and 104 may be spaced from the interior surface of the upper housing 64 by a plurality of mount supports 120 to allow the cooling air flow to pass over both sides of the control boards 102 and 104 as it circulates around the fan chamber 111 before exiting through the outlets 112, thereby enhancing the cooling of the electronics on the control boards 102 and 104.

Figure 7:
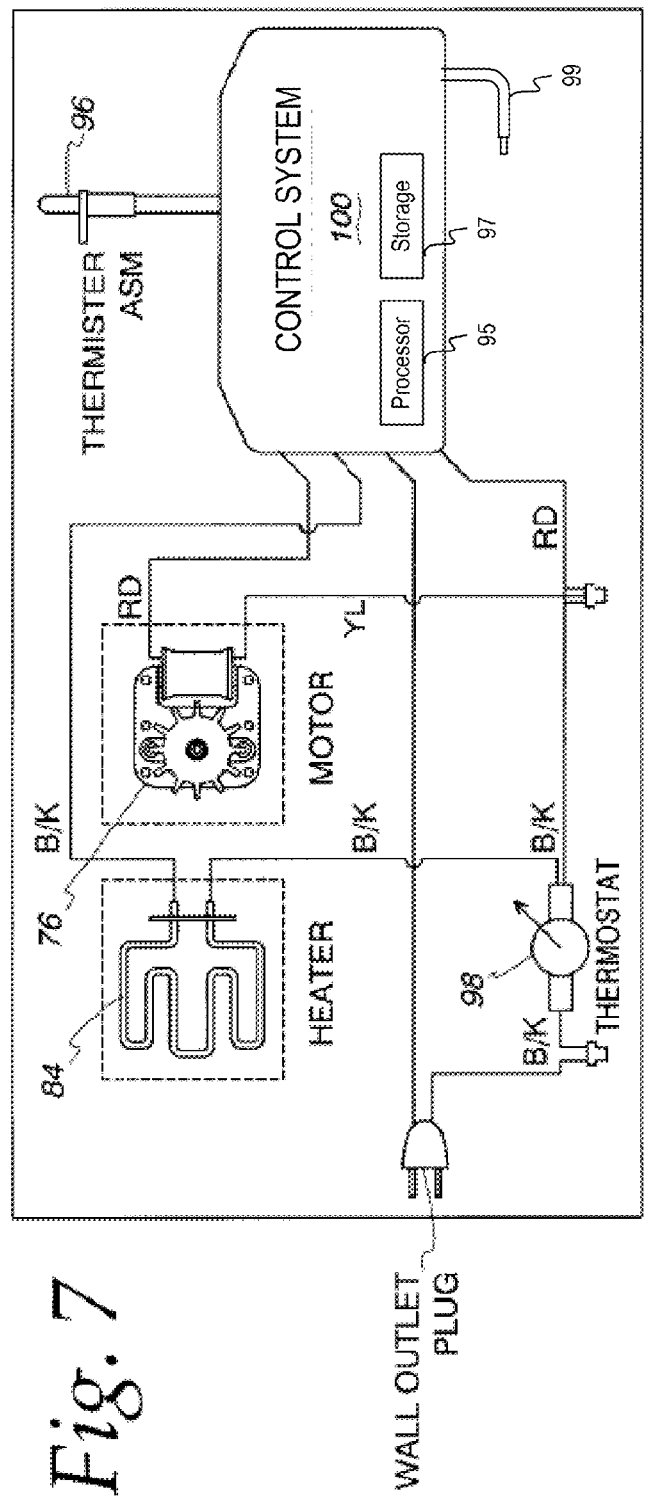
FIG. 7 depicts an exemplary embodiment of a diagrammatic representation of the operating components of the oven shown in FIG. 1, according to an exemplary embodiment of the present invention.

In an exemplary embodiment as shown in FIG. 7, the control system 100 may be coupled to the motor 76 and the heating element 84 to control the flow of electric power to the motor 76 and to one or more heating elements 84 in response to signals from the thermostat 98 and command signal input from the input interface 106 by a user (not shown). According to an exemplary embodiment, the control system 100 may be configured to selectively power the heating element 84 at a number of power levels P from a minimum power to a maximum power. At each power increment P, the control system 100 may power the heating element(s) 84 when the thermistor 96 indicates that the temperature in the cooking enclosure 21 has fallen below a low temperature set point associated with the particular power level P. The control system 100 then may terminate power to the heating element 84 when the temperature indicated by the thermistor 96 exceeds a high temperature set point associated with the particular power level P. The control system may provide power continuously to the motor 76 during the heating operations regardless of the power level selected. According to one exemplary embodiment, a multi-stage cooking recipe may be input, processed, stored, accessed, executed and/or deleted by the control system 100.

According to an exemplary embodiment, the control system 100 may heat the oven to a temperature determined by a power level. The control system 100 may support one or more power levels. Each power level may represent a target temperature to heat the oven to. In an exemplary embodiment, the control system 100 may have ten different selectable power levels. In an exemplary embodiment, the power levels may correspond to the temperatures 125° F., 150° F., 175° F., 200° F., 225° F., 250° F., 275° F., 300° F., 325° F., and/or 350° F.

In an exemplary embodiment, the oven may be designed to allow vegans and rawgetarians to cook the food to the point where the bacteria are eliminated but, at the same time, not eliminate vital enzymes in the food. For example, the oven may preserve vital enzymes in vegetables by controlling the temperature of the oven. In one such exemplary embodiment, a power level of the oven may set the desired temperature of the oven to be 106° F., though additional power levels of the oven may be configured to control the temperature of the oven for eliminating bacteria and preserving vital enzymes in food. In an exemplary embodiment, the power levels may correspond to the following temperatures: 106° F., 116° F., 150° F., 175° F., 225° F., 250° F., 275° F., 300° F., 325° F., and/or 350° F.

An exemplary embodiment of the control system 100 may also include a processor 95, and a storage device 97, such as, e.g., but not limited to, a memory, a register, a read-only memory (ROM), a random access memory (RAM), a solid state memory device, a flash memory device, a hard disk drive (HDD), a removable disk device such as, e.g., but not limited to, a CD-ROM, a DVD, etc. According to an exemplary embodiment, command signal input from the input interface 106 (such as, e.g., but not limited to, a keyboard, a keypad, a remote control, a voice activated interface, a voice recognition system, etc.) by a user may be received by the processor 95 and storage device 97 to create a multi-stage cooking recipe that may be further edited or executed. In an exemplary embodiment the multi-stage cooking recipe may be stored in the storage device 97 in the form of volatile memory for temporary storage, nonvolatile memory for permanent storage, or both. During execution the processor 95 may receive input from a variety of sources to determine what and when stages should be executed.

In an exemplary embodiment, the oven may further include a temperature probe 99. In an exemplary embodiment, the temperature probe 99 may be detachable from the oven for, e.g., but not limited to, cleaning, etc. The probe 99 may be physically connected to the oven during use or may be coupled, such as, e.g., but not limited to, through wireless communication, with the oven. In an exemplary embodiment, the temperature probe 99 may be attached to the oven and may or may not be removable from the oven. The temperature probe 99 may be inserted into objects being cooked so that information regarding the interior of the object, such as, e.g., but not limited to, temperature, level of doneness, etc., can be determined. The probe 99 information may be received by the processor 95 and may be used in the multi-stage cooking recipe programming and/or execution.

In the exemplary embodiment as shown in FIG. 8B, the oven may include a plurality of heating element 182, 184. The heating element(s) 182, 184 may have a top and bottom configuration, a side to side configuration, or some other configuration. In an exemplary embodiment, the heating elements may have individually selectable power levels, linked selectable power levels, and/or some combination. In an exemplary embodiment, the oven may include heating element(s) 172, 182, 184 on the bottom of the oven. In an exemplary embodiment, the heating element(s) 172, 182, 184 may be arranged such that drippings from the object being cooked do not fall upon the heating element(s) 172, 182, 184, such as, e.g., but not limited to, arranging a heating element 172 in a circular shape 170 around the cooking enclosure 21, as shown in FIG. 8A, or arranging two semi-circular heating elements 182, 184 in a circular shape 180, as shown in FIG. 8B, etc.

Figure 9A:
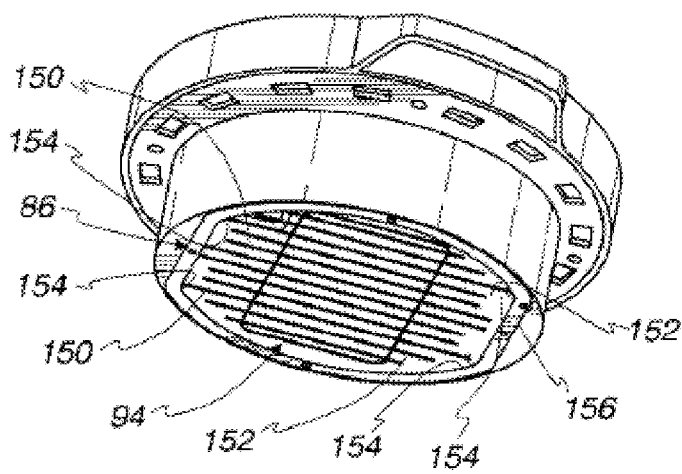
FIGS. 9A-D depicts exemplary embodiments of perspective views illustrating the mounting and the removal of a protective grid of the oven shown in FIG. 1, according to an exemplary embodiment of the present invention.
Figure 9B:
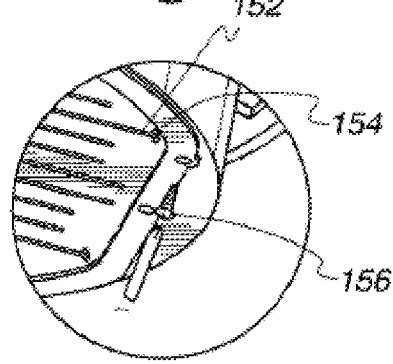
Figure 9C:
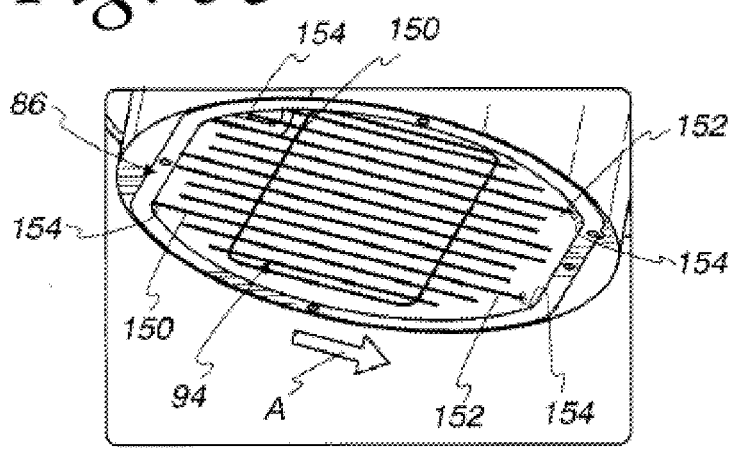
Figure 9D:
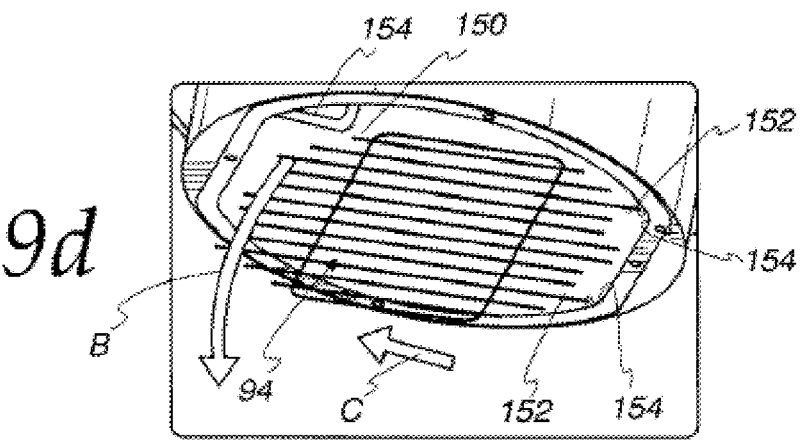

In an exemplary embodiment as shown in FIG. 9a, the protective grid 94 may include a first pair of legs 150 that may be oppositely directed relative to a second pair of legs 152. In an exemplary embodiment as shown in FIG. 9b, each of the exemplary legs 150, 152, may be slidably received in a mating aperture 154 in the heater housing 86 to detachably mount the protective grid 94 to the heater housing 86. A fastener 156 may be engaged with the heater housing 86 for movement between a first position shown in FIG. 9a where the fastener engages one of the legs 152 to restrict movement of the grid 94 relative to the heater housing 86 to prevent removal of the grid 94 from the heater housing 86, and a second position shown in FIG. 9b where the fastener may be disengaged from the one leg 152 to allow removal of the grid 94 from the heater housing 86. In the exemplary embodiment as shown in FIG. 9b, the fastener 156 may be provided in the form of a threaded set screw that is threadably engaged with the housing 86, with the end of the set screw frictionally engaging the one leg 152 in the first position shown in FIG. 9a. In this regard, it should be noted that for the fastener to be in the second position it need not be completely removed from the housing 86 as shown in FIG. 9b, rather, the fastener 156 need only be positioned so that it is disengaged from the one leg 152 to allow movement of the grid 94 relative to the housing 86. In the exemplary embodiment as shown in FIG. 9c, with the exemplary fastener 156 in the second position, the legs 152 may be slid in the apertures 154 to allow the grid 94 to move relative to the housing 86 in the direction of the legs 152, as indicated by Arrow A, to thereby remove the legs 150 from their mating apertures 154. Once the exemplary legs 150 are removed from their mating apertures 154, the grid 94 may be tilted downward as shown by the arrow B in FIG. 9d and then the grid 94 may be moved in the direction of the legs 150, as indicated by Arrow C, to thereby remove the legs 152 from their mating apertures 154 and thus, the grid 94 from the housing 86. Removal of the exemplary grid allows for cleaning of the heating element 84, the fan 80, the reflector plate 88, and the interior of the housing 86.

In the exemplary embodiments as shown in FIGS. 10 and 11, in an alternative embodiment of the base 12, the one or more supports 28 may be provided in the form of three or more circumferentially spaced feet 28B that extend from the side wall 24 to underlie the oven pan 14, and the thermal insulators 30 may be provided in the form of three or more thermal insulating spacers 30B, each supported by one of the feet 28B.

In the exemplary embodiments as shown in FIGS. 12 and 13, in an alternative embodiment of the base 12, the one or more supports 28 may be provided in the form of an annular shoulder 28C formed on the interior surface 22 of the base 12, and the one or more insulators 30 may be provided in the form of a thermal insulating ring 30C that is supported by the shoulder 28C.

Figure 14A:
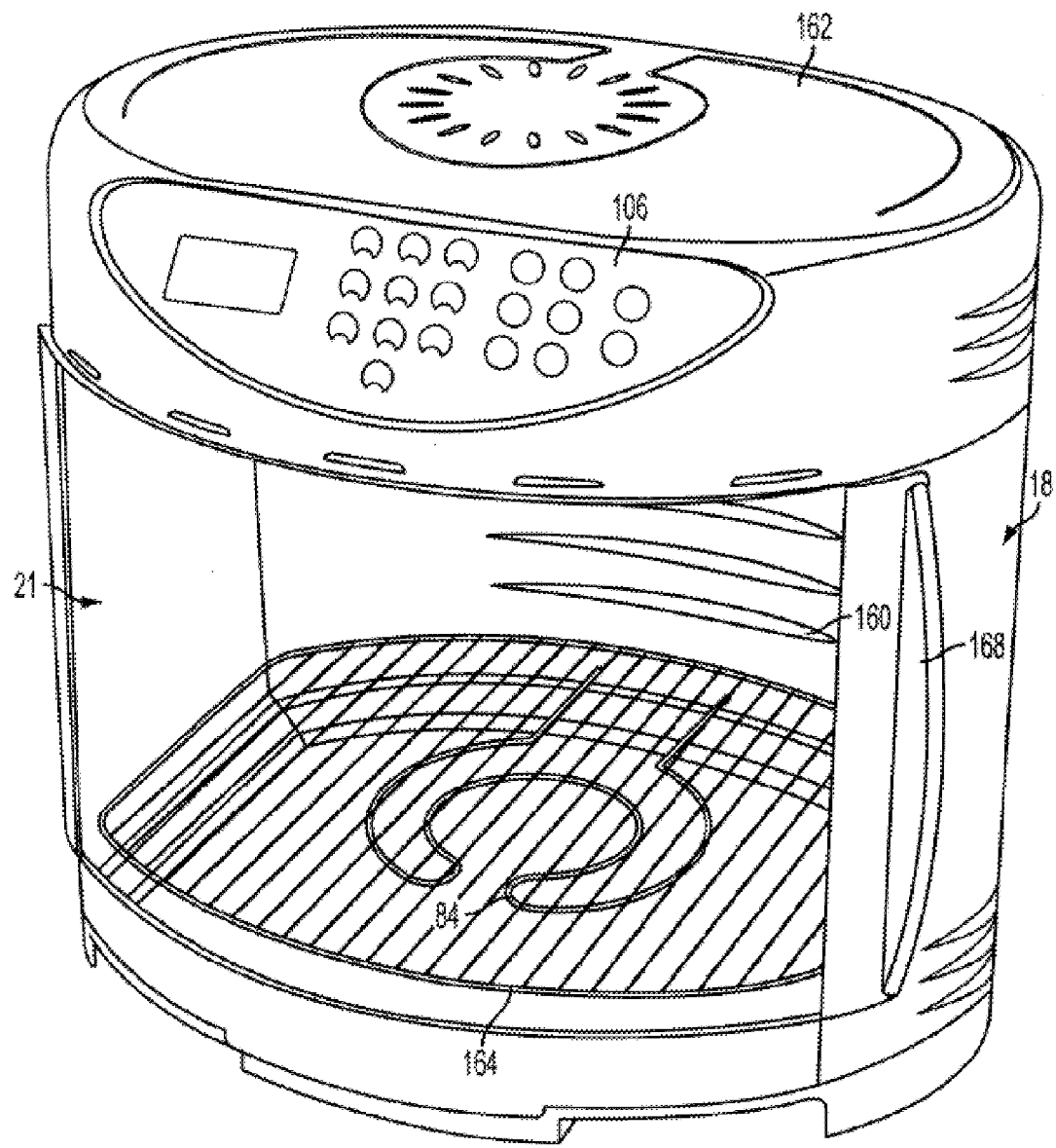
FIGS. 14A-B depict an exemplary embodiment of isometric views of exemplary embodiments of the present invention.
Figure 14B:
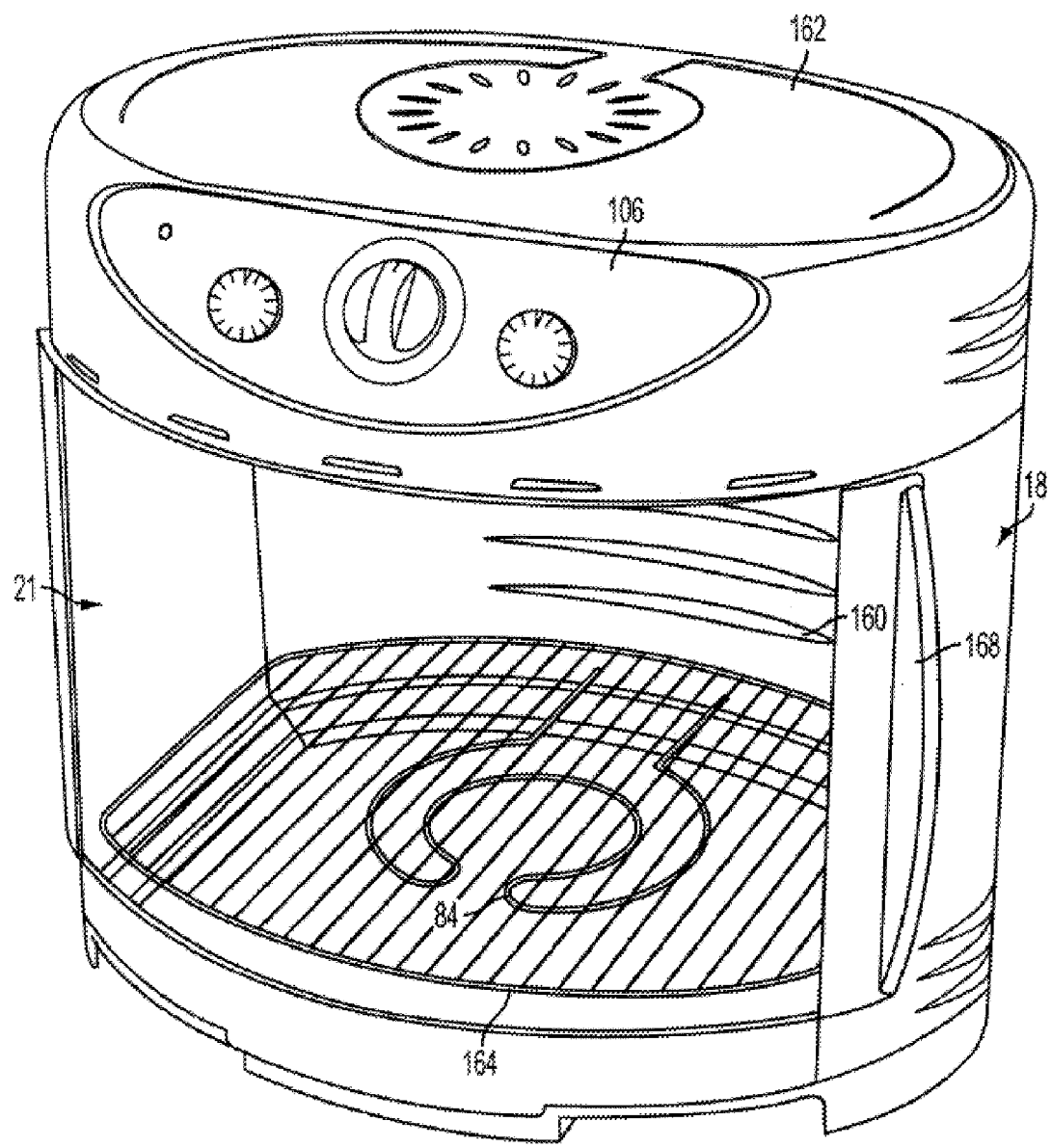
Figure 15:
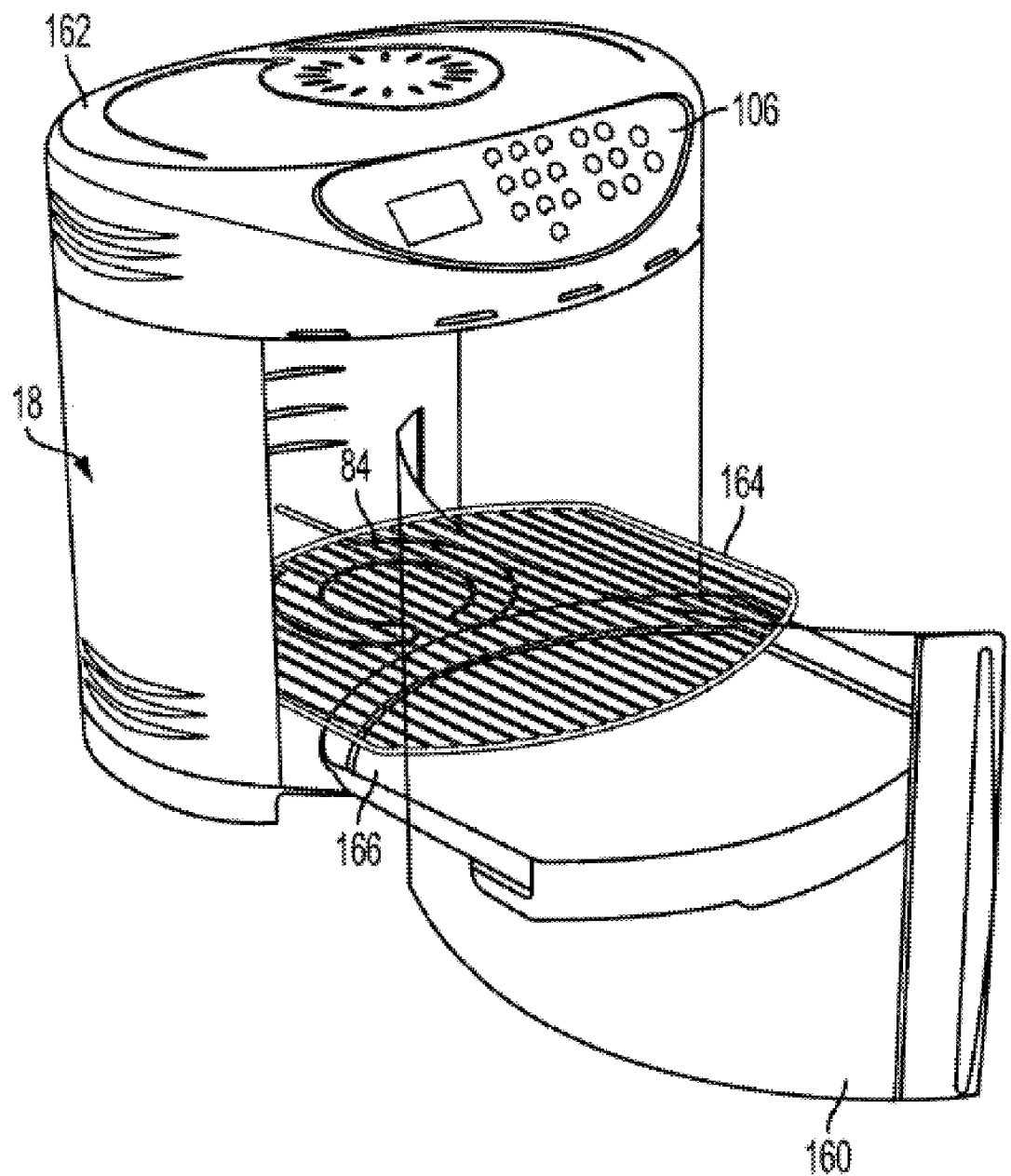
FIG. 15 depicts an exemplary embodiment of an isometric exploded view of an exemplary embodiment of the present invention.
Figure 16A:
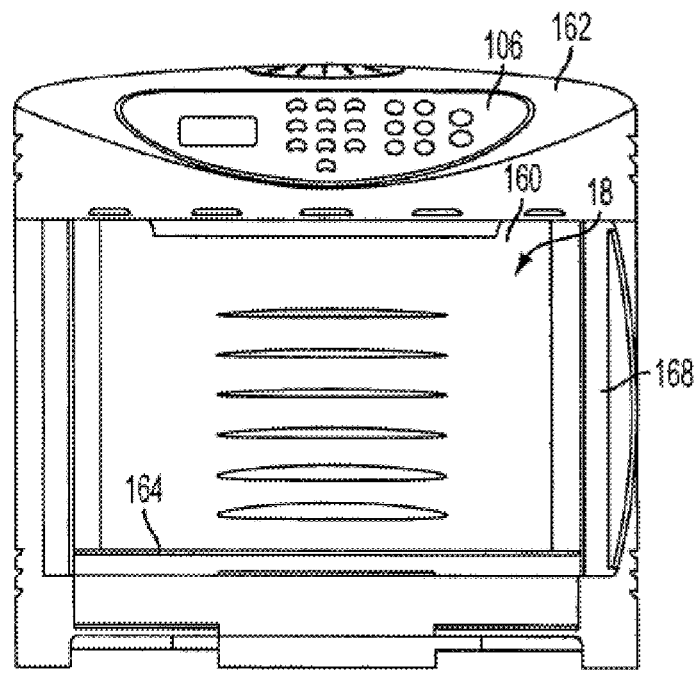
FIGS. 16A-16B depict a front and side view of an exemplary embodiment of the present invention.
Figure 16B:
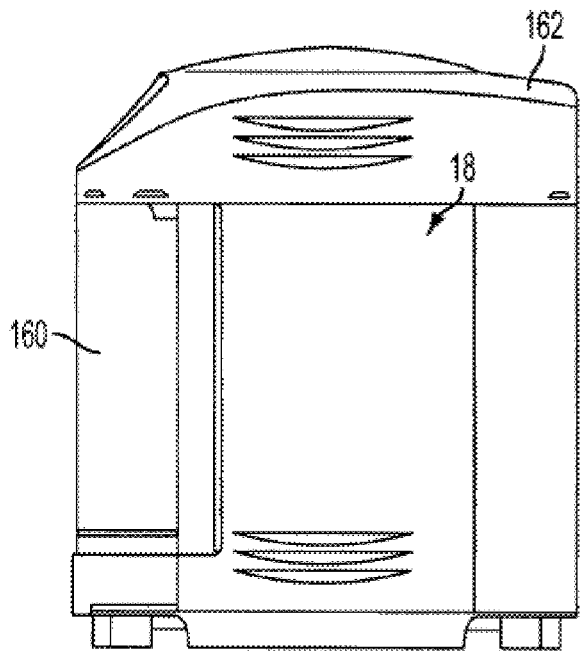

In the exemplary embodiments as shown in the various perspectives of FIGS. 14A, 14B, 15, 16A and 16B, the cooking enclosure 21 may include metal and/or glass such that the oven can sustain a higher maximum temperature than an oven composed of polycarbonate can sustain. According to an exemplary embodiment, the oven may include a digital interface, as shown in FIG. 14A, and/or an analog interface, as shown in FIG. 14B. According to an exemplary embodiment, the cooking enclosure 21 may include a non-detachable power head 162 and/or a hinged and/or sliding glass door 160 that may be opened to insert and remove objects from the oven. In an exemplary embodiment the oven housing 18 may include a groove 168 along the edge of the glass door for grip. In an exemplary embodiment depicts in FIG. 15, the hinged and/or sliding glass door 160 may be detached for easy cleaning. In another exemplary embodiment, the cooking enclosure 21 may include a door which is slidable (not shown). In an exemplary embodiment the oven may include a slidably removable cooking rack 164 and a slidably removable oven pan 166. In an exemplary embodiment, the oven can be adapted to receive a rotisserie. According to an exemplary embodiment the oven may include a side or top view which may be, e.g., but not limited to, a circular shape, an oval shape, or any number of other shapes such as, e.g., but not limited to, triangular, square, rectangular, trapezoidal, octagonal, polygonal, pentagonal and/or hexagonal, etc.

In a further embodiment, the oven may also include a small window (not shown) that can be optionally opened to let steam or moisture out of the oven, allowing the food to cook crispier. In an exemplary embodiment, the window may be a small glass door arranged on the glass door 160, though the window may also be arranged elsewhere on the oven. In an exemplary embodiment, the window may be sliding or folding and may be, e.g., but not limited to, 20 mm×50 mm in size. In an alternative embodiment, the window may be a hole plugged in with non-conductive material such as, e.g., but not limited to, silicon rubber, which may be unplugged to let moisture or steam out.

Figure 17:
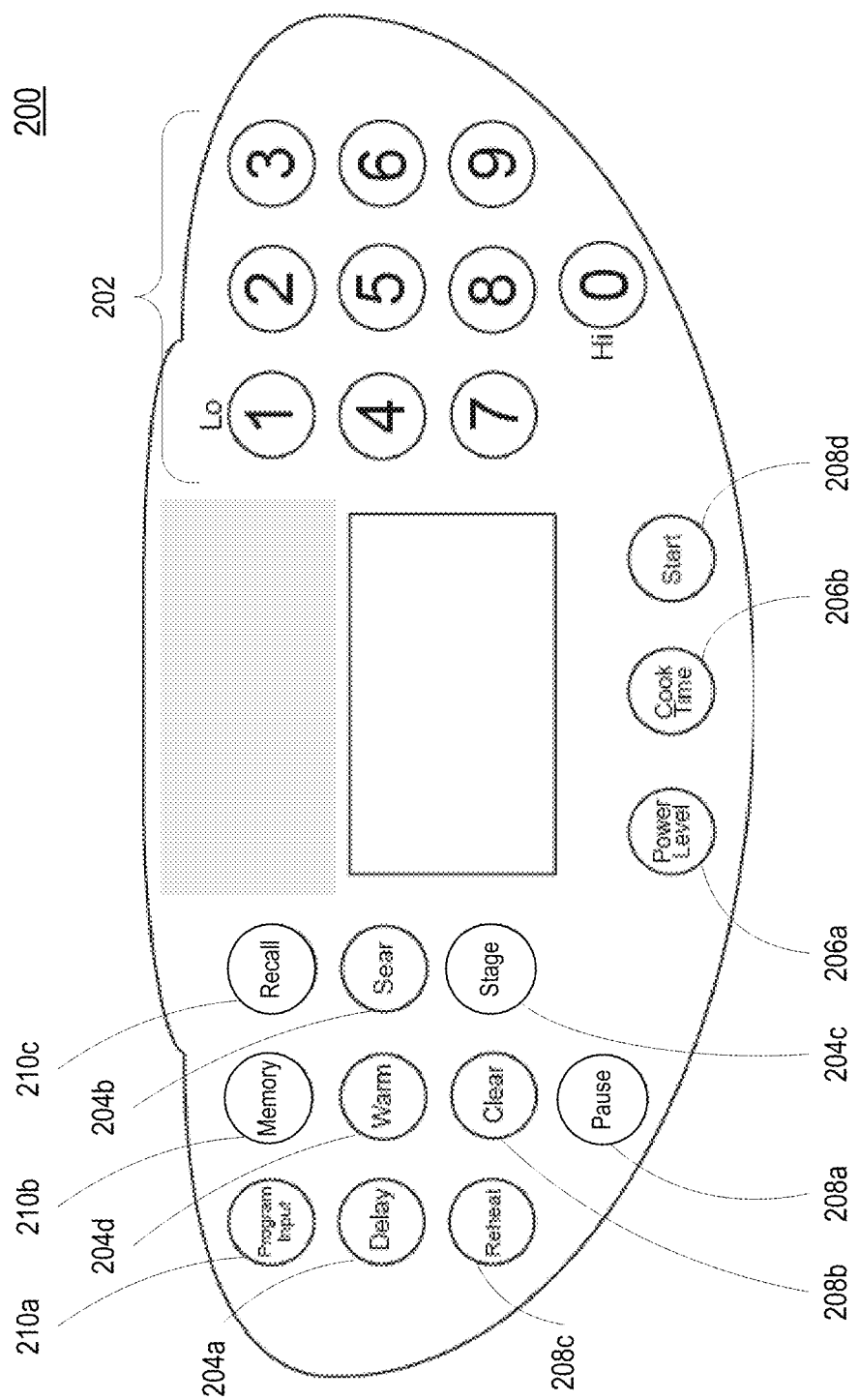
FIG. 17 depicts an exemplary embodiment of an input interface of an exemplary embodiment of a multi-stage cooking electric oven.

FIG. 17 depicts an exemplary input interface 200 of an exemplary embodiment of a multi-stage cooking electric oven. The input interface 200 may include, e.g., but not limited to, a numeric keypad 202 by which numerical values can be inputted into the oven for values such as, e.g., but not limited to, the power level, time duration of cooking, desired temperature, level of doneness, memory address, etc. Alternatively, a voice recognition and/or other input interface 200 may be included. The input interface 200 may also include control elements corresponding to various stages of a recipe including, e.g., but not limited to, a delay stage 204a, a sear stage 204b, a 204c, and/or a warm stage 204d, etc. The input interface 200 may also include control elements for programming information for each stage including, e.g., but not limited to, power level 206a, cook time 206b, etc. The input interface 200 may also include control elements for commands such as, e.g., but not limited to, pause 208a, clear 208b, reheat 208c, start 208d, etc. The input interface 200 may also include control elements for programming functions such as, e.g., but not limited to, program input 210a, memory 210b, recall 210c, etc.

Figure 18:
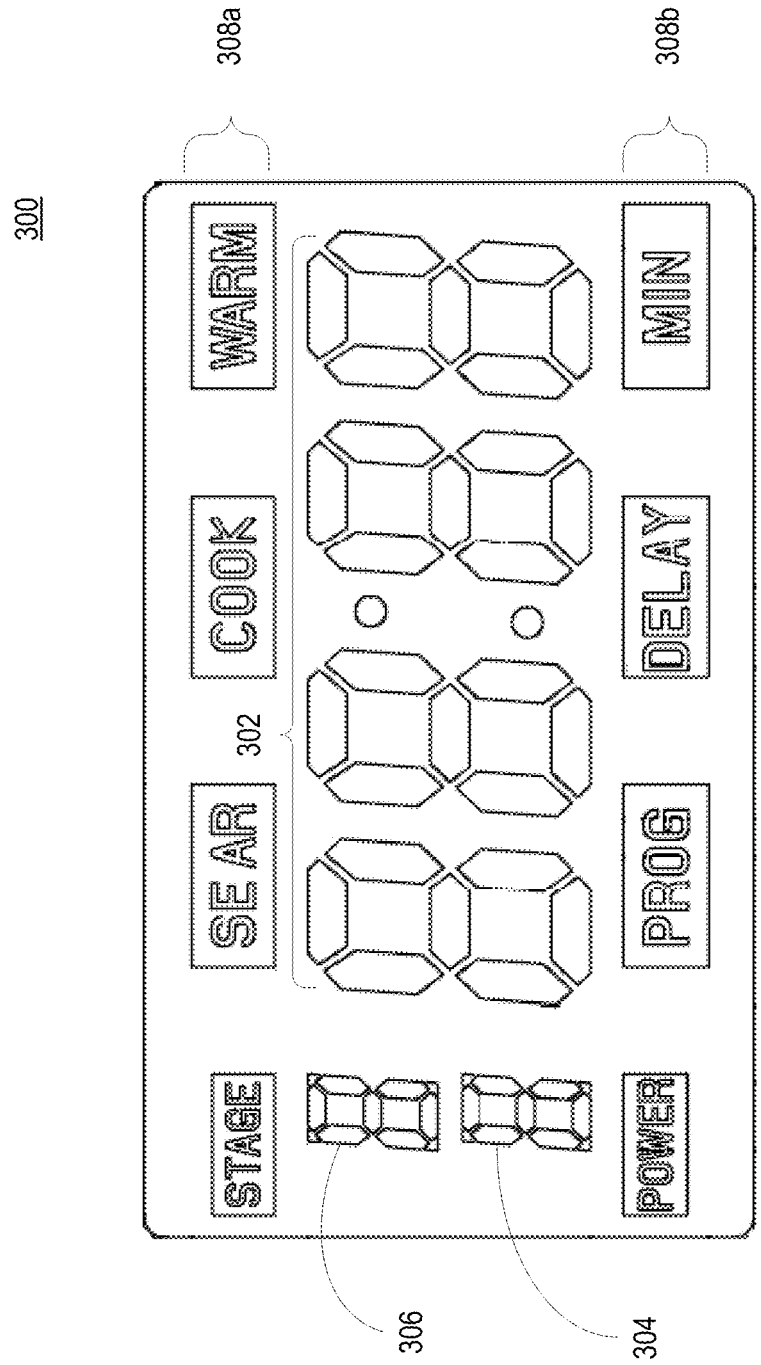
FIG. 18 depicts an exemplary embodiment of a numeric display panel of an exemplary embodiment of a multi-stage cooking electric oven.

An exemplary display panel 300 of an exemplary embodiment of a multi-stage cooking electric oven is shown in FIG. 18. The exemplary display panel 300 can show multi-stage cooking recipe information such as, e.g. but not limited to, time, power level, and/or stage, etc. The exemplary display panel 300 may include an area in which a numerical value can be displayed, in the exemplary embodiment, comprising of four seven-segment displays 302. The numerical value can represent information regarding, e.g., but not limited to, the duration time, duration of time left, memory address to save and/or load a multi-stage cooking recipe, etc. The exemplary display panel 300 may also include, e.g., but not limited to, a display in which the power level of a stage can be displayed 304. Another display, in the exemplary embodiment may show the stage number 306. The exemplary display panel 300 may also include, e.g., but not limited to, indicators 308a, 308b for each type of stage or type of programming information needed. In the exemplary embodiment, the indicators may represent POWER, PROG, DELAY, MIN, STAGE, SEAR, COOK and/or WARM. In an exemplary embodiment, these indicators may blink when their corresponding information may be entered and may remain lit after their corresponding information is set. According to an exemplary embodiment, during execution these indicators may light up to indicate which stage is being executed and which stages may remain.

Figure 19:
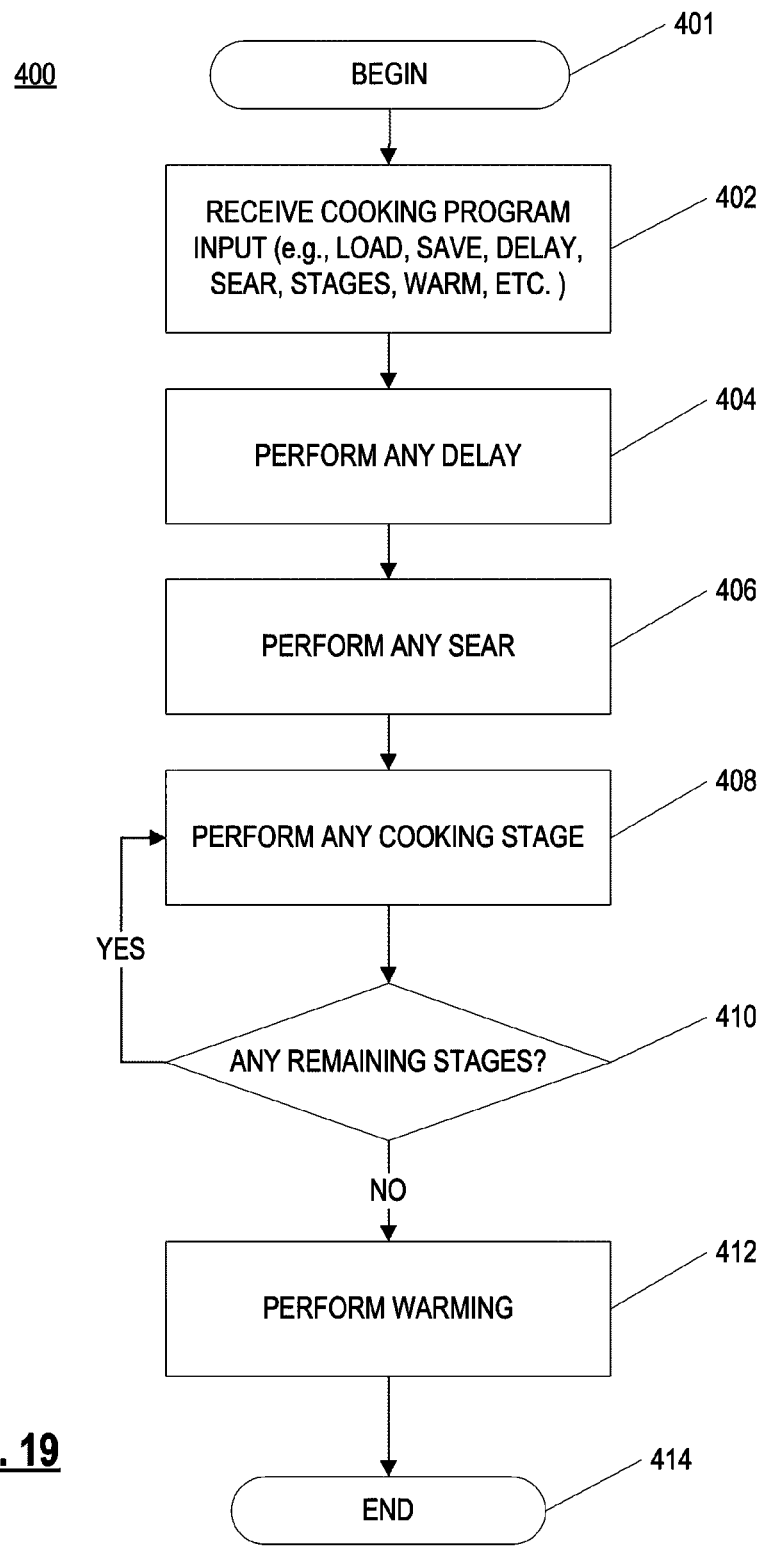
FIG. 19 depicts an exemplary flowchart of a basic overview of an exemplary embodiment of a multi-stage cooking recipe algorithm executable by an exemplary control system of an exemplary counter-top oven.

FIG. 19 is an exemplary process flowchart 400 of a basic multi-stage cooking recipe algorithm executable by an exemplary control system of an exemplary counter-top oven, according to an exemplary embodiment of the invention. According to an exemplary embodiment, the process flowchart 400 may begin at 401 and may continue with receiving cooking programming input for a multi-stage cooking recipe from the input interface, 402 (the method described in further detail in FIG. 20-22). After the Start button is depressed, any programmed delay stage may be performed, 404. During the delay stage the microwave may wait for the corresponding programmed duration before beginning cooking in the following stages. At the end of the delay stage the oven may beep to signal the end of the stage. After the delay stage, any sear stage may be performed, 406. The sear stage may heat the oven to a high temperature to sear the food initially for better browning and locking in juices. At the end of the sear stage the oven may beep to signal the end of the stage. After the sear stage any user-defined cooking stages may be performed, 408. In an exemplary embodiment, there may be multiple user-defined cooking stages, e.g., but not limited to, three, four, five, six, etc., cooking stages. In an exemplary embodiment, the initial user-defined cooking stage may be performed by heating the oven according to a specified power level for a duration corresponding to factors such as, e.g., but not limited to, duration of time, desired temperature, level of doneness, etc. After the initial cooking stage, if any user-defined stages remain, each subsequent cooking stage may be sequentially performed, 410. After all cooking stages are completed, the oven may beep four times and then may perform a warm stage, if any, 412. During the warm stage, the oven may heat the food at a low temperature to keep the food warm while it is in the oven. The process flowchart 400 may then end, 414.

An exemplary process of receiving cooking program input 402 is shown in greater detail in FIG. 20, according to an exemplary embodiment of the invention. In an exemplary embodiment, the process 402 may begin at program input stage, 500. In an exemplary embodiment, the program input may occur when the control system may receive a Memory/Recall input request, 502, and/or receive a Program Input request, 510. When a Memory/Recall input request 502 is received, the control system may display "PROG" and '0' on the LCD, and may wait to receive a valid memory number, 504. Upon receiving a memory number, the control system may then load the previously programmed user-entered multi-stage cooking recipe from the corresponding memory address, 506.

According to an exemplary embodiment, after a program loads, 506, and/or a Program Input request is received, 510, the control system may display "PROG" on the LCD, 512. The control system may then wait for further user input, 514. If the system receives a Delay input request, 520, it may receive the Delay input parameters, 522 (described further in FIG. 21A). If the system receives a Sear input request, 530, it may receive the Sear input parameters, 532 (described further in FIG. 21B). If the system receives a Warm input request, 540, it may receive the Warm input parameters, 542 (described further in FIG. 18C). If the system receives a Cooking Stage input request, 550, it may receive the Cooking Stage input parameters, 552 (described further in FIG. 22). If the system receives a Memory/Recall input request, 560, it may display "PROG" and '0' on the LCD, 562. After the control system receives the memory number and the program set request, it may save the current cooking recipe to the corresponding memory address, 564. In the case where the corresponding memory address already has a previously saved cooking recipe, the previously programmed recipe may be overwritten with the current recipe. After receiving the input in each of the above cases, the control system may then return to display "PROG" on the LCD, 512, and may wait for further user input, 514. When the control system receives a Start request, 570, program input may end, 572, and the control system may begin execution of the recipe as shown in FIG. 16. In an, exemplary embodiment additional programming such as, e.g., but not limited to, editing, adding and/or deleting stages may occur even during execution of the recipe.

Figure 21A:
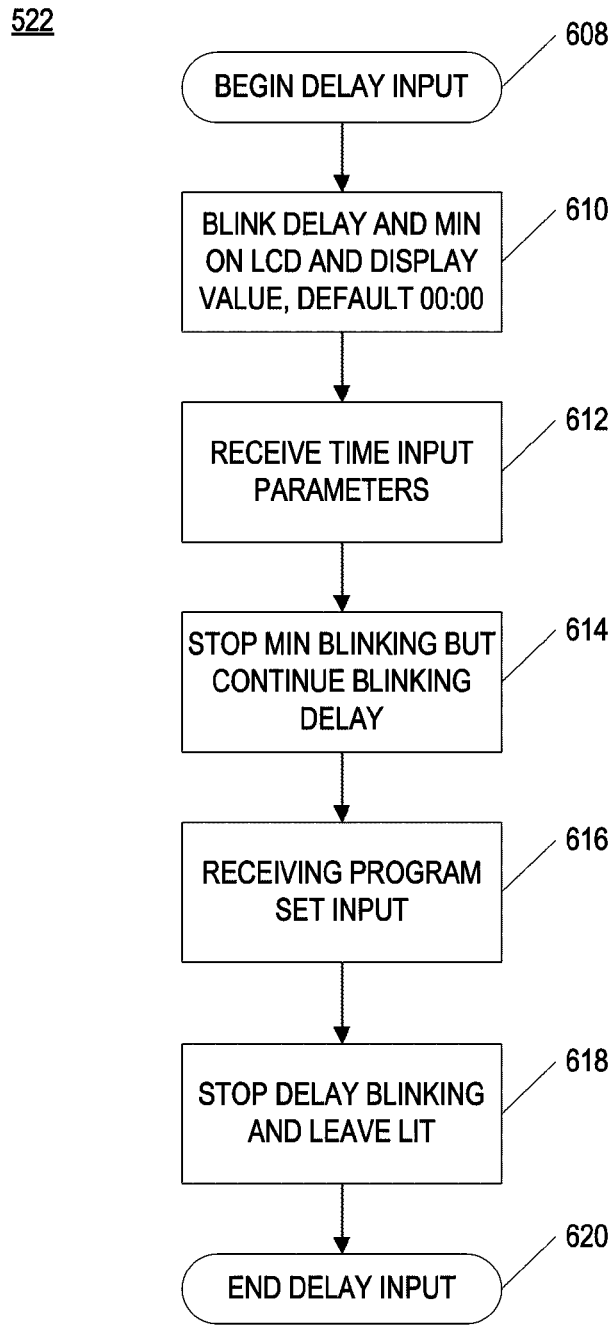
FIG. 21A-C depict exemplary flowcharts of exemplary ways exemplary stage input parameters of a multi-stage cooking recipe may be received.

Referring now to FIG. 21A, an exemplary process flow 522 of how Delay input parameters may be received is described in further detail. In an exemplary embodiment, as shown in FIG. 20, when an input request is received, 520, Delay input parameters may be received, 522. In an exemplary embodiment, the process flow 522 may start at 608 and may continue, in response to the input request, to blink DELAY and MIN on the LCD and/or display the current time duration value of the delay, 610. If there is no current value, the default value may be 00:00. Upon the control system receiving the time input parameters from user input, 612, MIN may stop blinking, but DELAY may continue to blink, 614. After receiving the Program Set input, 616, DELAY may stop blinking and/or may remain on, 618. From 618, the process flow 522 may then end, 620.

Figure 21B:
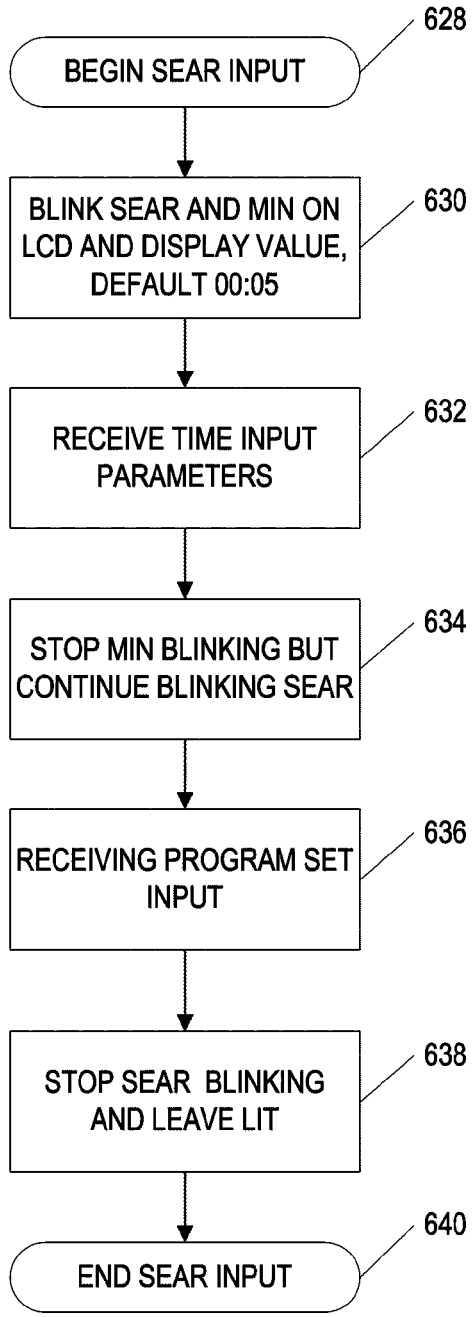

FIG. 21B describes an exemplary process flow 532 of how Sear input parameters may be received, according to an exemplary embodiment of the invention. In an exemplary embodiment, as shown in FIG. 20, when a Sear input request is received, 530, Sear input parameters may be received, 532. In an exemplary embodiment, the process flow 532 may start at 628 and may continue, in response to the input request, to blink SEAR and MIN on the LCD and/or display the current time duration value of the sear, 630. If there is no current value, the default value may be 00:05. Upon the control system receiving the time input parameters from user input, 632, MIN may stop blinking, but SEAR may continue to blink, 634. After receiving the Program Set input, 636, SEAR may stop blinking and may remain on, 638. From 638, the process flow 532 may then end, 640.

Figure 21C:
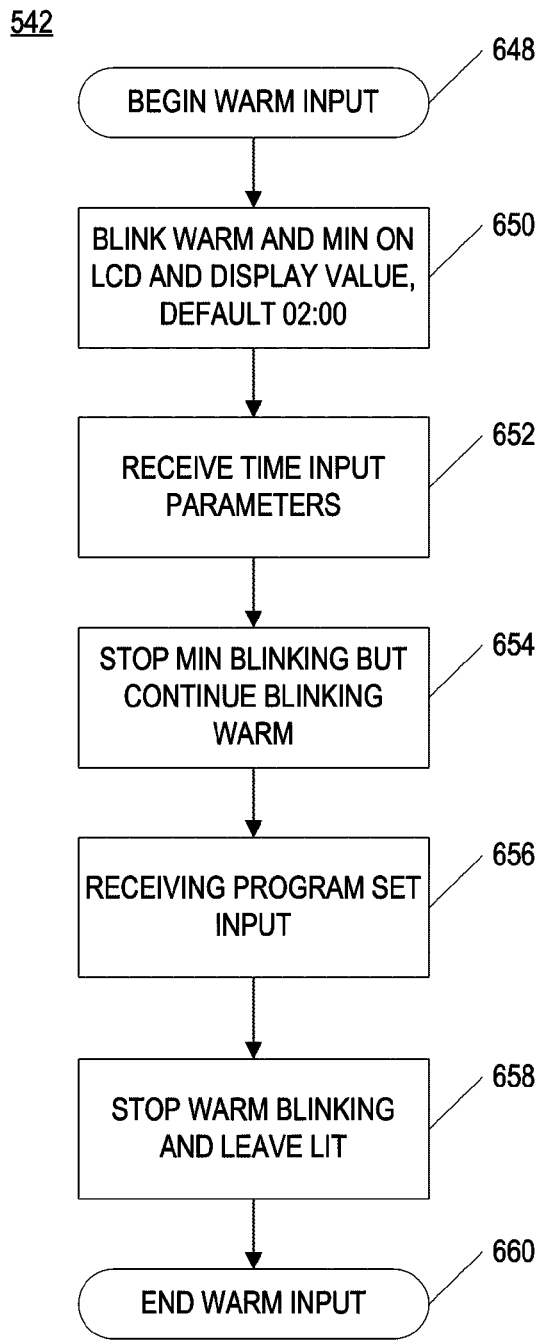

FIG. 21C describes an exemplary process flow 542 of how Warm input parameters may be received, according to an exemplary embodiment of the invention. In an exemplary embodiment, as shown in FIG. 20, when a Warm input request is received, 540, Warm input parameters may be received, 542. In an exemplary embodiment, the process flow 542 may start at 648 and may continue, in response to the input request, to blink WARM and MIN on the LCD and/or display the current time duration value of the warm, 650. If there is no current value, the default value may be 02:00. Upon the control system receiving the time input parameters from user input, 652, MIN may stop blinking, but WARM may continue to blink, 654. After receiving the Program Set input, 656, WARM may stop blinking and may remain on, 658. From 658, the process flow 542 may then end, 660.

Figure 22:
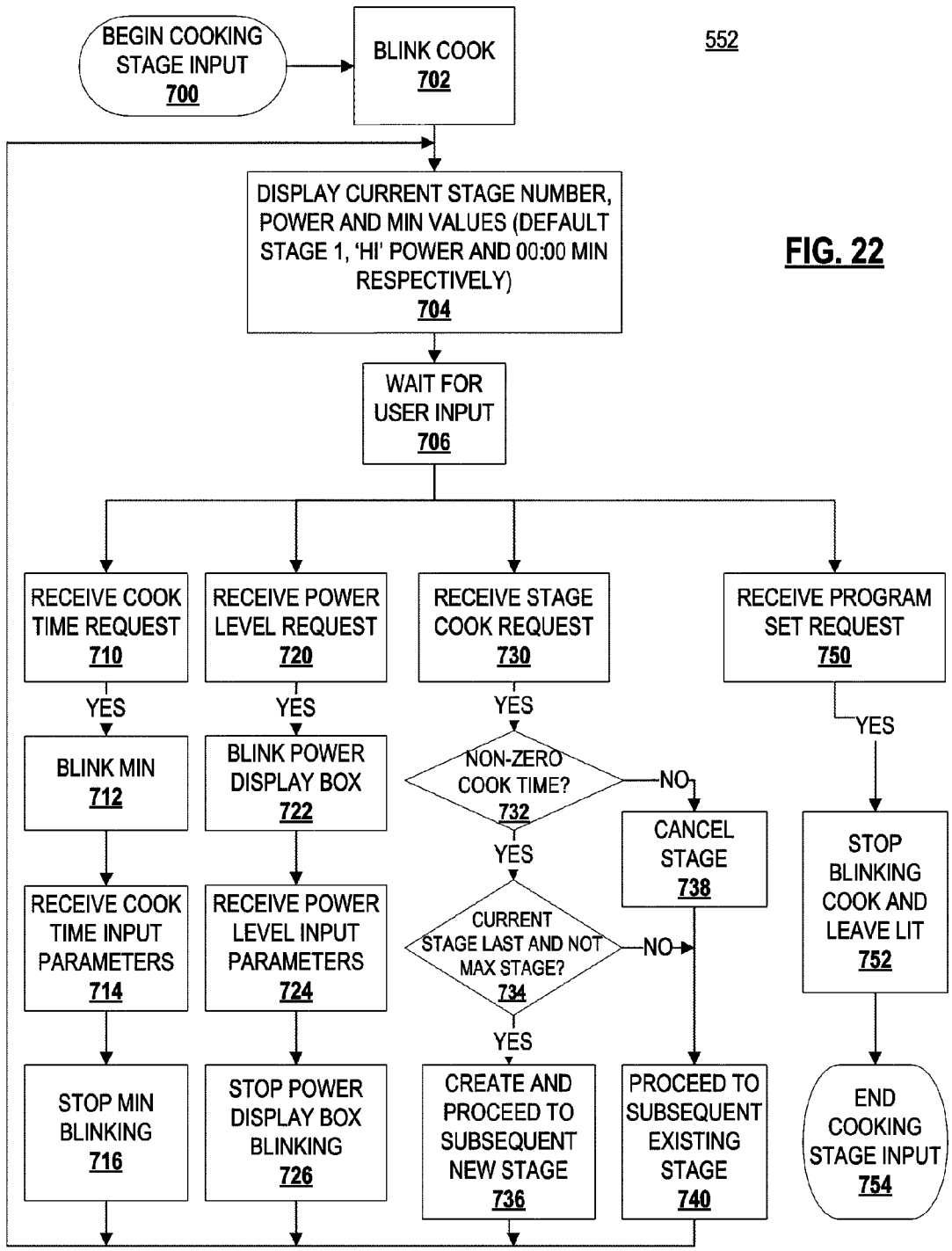
FIG. 22 depicts an exemplary flowchart of an exemplary way exemplary cooking stage input parameters of a multi-stage cooking recipe may be received.

Referring to FIG. 22, an exemplary process flow 552 of receiving Cooking stages after receipt of a Cooking State input request is described in further detail, according to an exemplary embodiment of the invention. In an exemplary embodiment, as shown in FIG. 20, cooking stages may be received 552 after a Cooking Stage input request has been received, 550. In an exemplary embodiment, the process flow 552 of cooking stages may begin at 700 and may continue with blinking COOK on the LCD, 702. The control system may then display the current stage number, power level for the stage and time duration of the stage, 704. If there are no current values for any of the above elements, the default values of Stage '1', "HI" power, and "00:00" min may be used, respectively. The control system may then wait for further user input. The system may then wait for a Cook Time input request, 710, a Power Level input request, 720, a Stage Cook input request, 730, and/or a Program Set input, 750.

If a Cook Time input request is received, 710, the system may blink MIN, 712. Upon receiving the Cook Time input parameters from user input for the Cooking Stage, 714, MIN may stop blinking, 716.

If a Power Level input request is received, 720, the system may blink the Power Level display box, 722. Upon receiving the Power Level input parameters from user input for the Cooking Stage, 724, the Power Level display box may stop blinking, 726.

If a Stage Cook input request is received, 730, the system may check whether the current stage has a non-zero Cook Time duration value, 732. If the duration value is non-zero, then the system may check whether the current stage is the last defined stage and that the maximum number of stages has not been reached, 734. If the current stage is the last defined stage and is not the maximum stage allowed, the system may create a new subsequent stage and proceed to that stage, 736, displaying and assigning values as previously described for, 704. If the current stage is not the last defined stage and/or the current stage is the maximum stage allowed, the system may proceed to the subsequent existing stage, 740. In the case where the current stage is not the last defined stage, the subsequent existing stage may be the next numerical stage. In the case where the current stage is the maximum stage allowed, the subsequent existing stage may be the first stage, Stage 1. If the current stage cooktime is not non-zero, the current stage may be cancelled, 738, which may require the system to automatically renumber any subsequent stages, and the system may proceed to the subsequent existing stage. In the case where the current cancelled stage was the last stage, the subsequent existing stage may be the first stage, otherwise, the subsequent existing stage may be the following stage. If the program set request is received, 750, the system may stop blinking COOK and leave COOK lit, 752 and may end receiving cooking stage input. The process 552 may then end at 754.

In an exemplary embodiment, the oven may accept commands for actions such as, e.g., but not limited to, pause, start, clear, display sensor data, and/or reheat, etc. An exemplary pause command may suspend execution of the recipe. An exemplary start command may unpause execution. An exemplary clear command may clear current programming information being entered. An exemplary display sensor data command may display on the interface, sensor information, such as, e.g., but not limited to, temperature and/or level of doneness, etc. An exemplary reheat command may set the power level to "HI" for 4 minutes. According to an exemplary embodiment, commands may be received and executed during the multi-stage cooking recipe programming and/or during execution of a multi-stage cooking recipe.

Figure 23A:
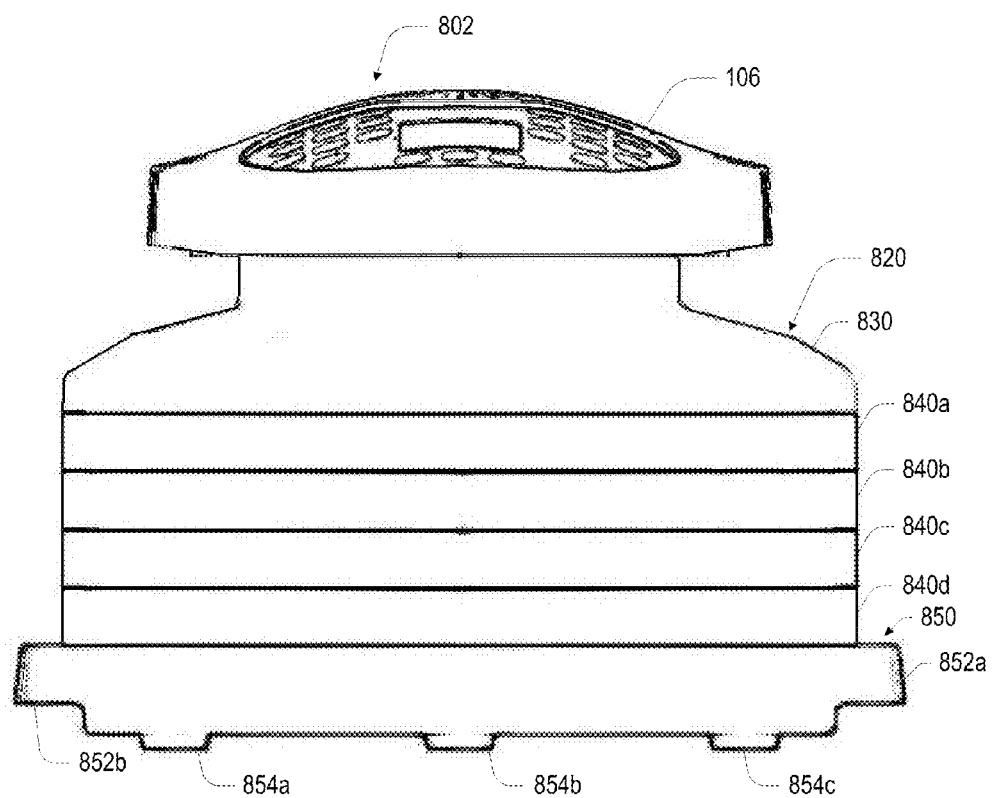
FIG. 23A-B depict exemplary front and side views of an exemplary embodiment of a dehydrator.
Figure 23B:
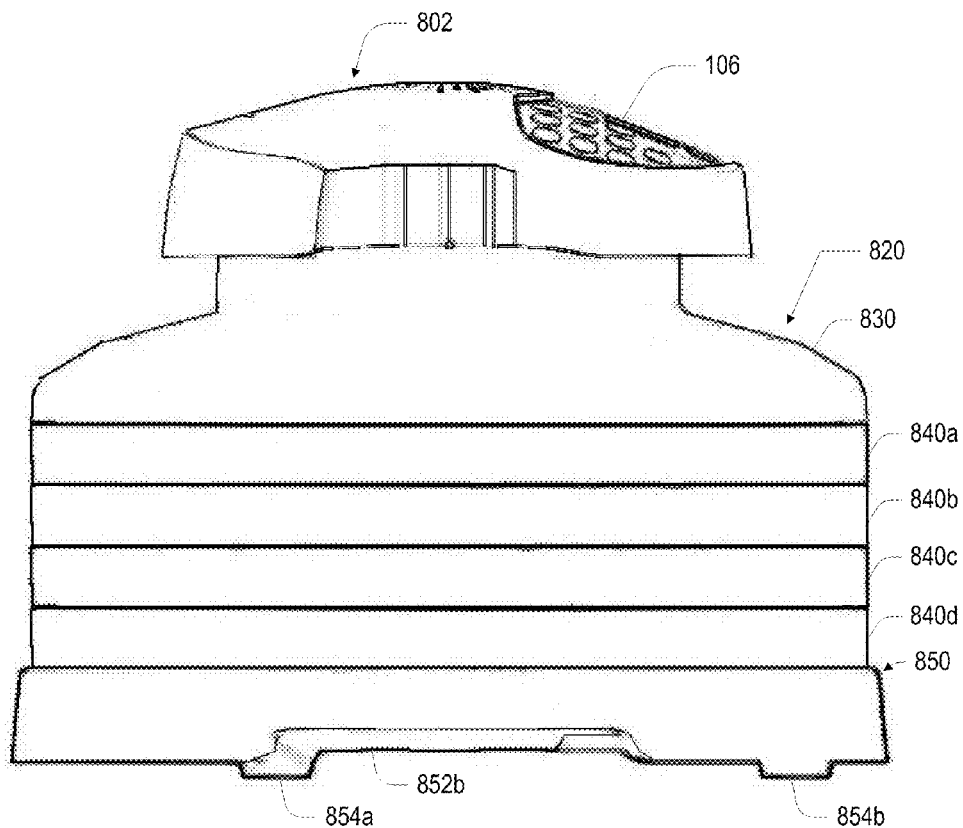
Figure 25:
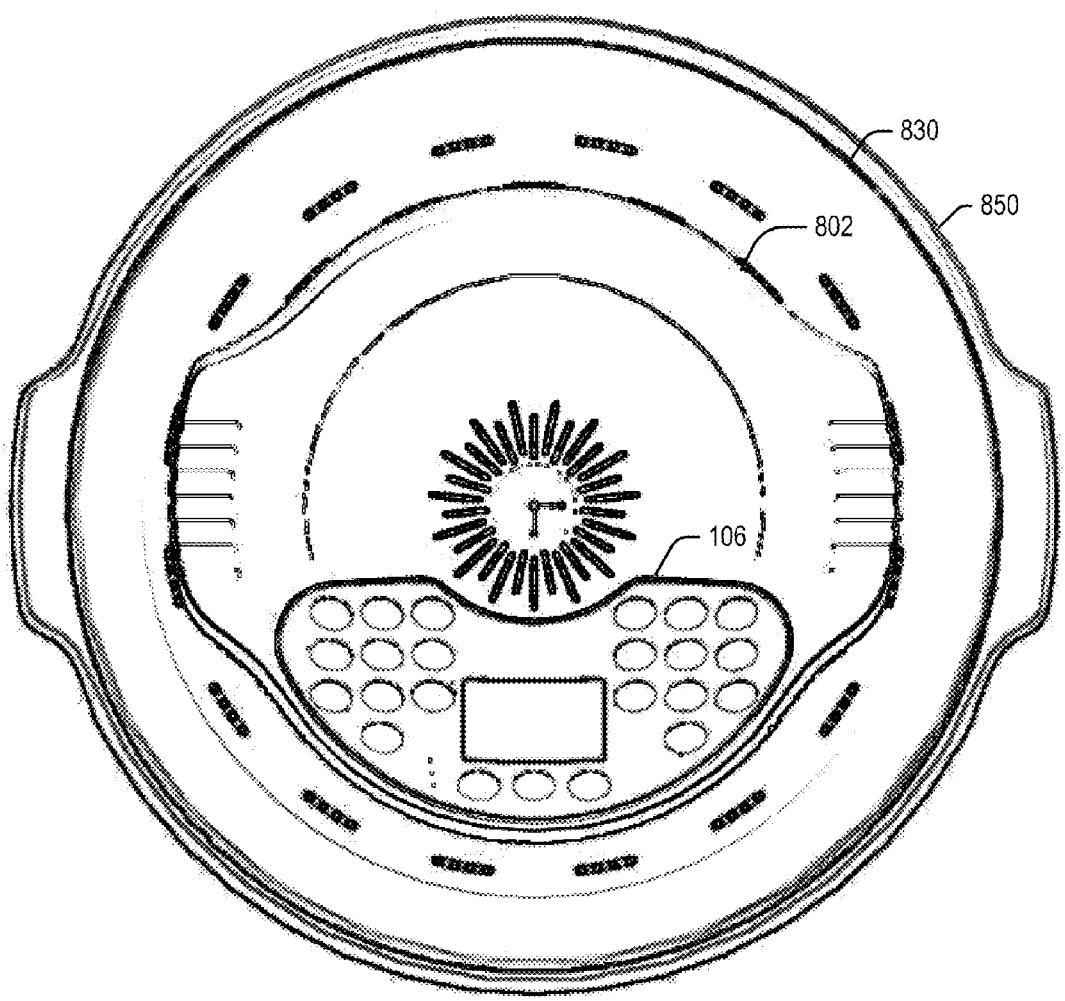
FIG. 25 depicts an exemplary top view of an exemplary embodiment of an exemplary dehydrator.

FIG. 23A-B depict exemplary front and side views of an exemplary embodiment of a dehydrator which may have a substantially circular top view, as shown in FIG. 25, which may be used in accordance with the present embodiments.

In an exemplary embodiment, the dehydrator may dehydrate food. According to an exemplary embodiment, an exemplary such dehydrator may include an exemplary power unit 802 and a dehydrating enclosure 820. In an exemplary embodiment, power unit 802 may provide and regulate dehydrating air for dehydrating food within the dehydrating enclosure 820. According to an exemplary embodiment, the power unit may be detachably couplable to a cooking enclosure 21 and a dehydrating enclosure 820. In an exemplary embodiment, the power unit may be the power head for the above noted multi-stage counter-top electric oven. In alternative exemplary embodiments, the power unit may comprise a heat source for any exemplary type of exemplary oven. In an exemplary embodiment, the power unit 802 may comprise one or more input, output and/or control interfaces, including ancillary equipment.

According to an exemplary embodiment, the power unit 802 may comprise a power source disposed inside the power unit and a control source operable to control the power source. According to an exemplary embodiment, the power source of the power unit may include a heating unit and a fan unit. In an exemplary embodiment, the heating unit may include a heating element operable to provide heat to an enclosure and a thermostat system operable to measure an internal temperature of the enclosure and provide input regarding the internal temperature to the control source. According to an exemplary embodiment, the thermostat system may include a thermister operable to measure the internal temperature of the enclosure and a thermostat adjustable to set a desired temperature of the enclosure. In an exemplary embodiment, the fan unit may include a fan chamber and a fan mounted in the fan chamber operable to create a dehydrating air flow throughout any one of the cooking enclosure or the dehydrating enclosure.

For example, in an exemplary embodiment similar to the above noted description of FIG. 7, for example, with respect to a multi-stage counter-top electric oven, the power unit 802 may include a control system 100 coupled to an exemplary motor 76 and a heating element 84 to control the flow of electric power to the motor 76 and to one or more heating elements 84 in response to signals from an exemplary thermostat 98 and an exemplary command signal input from an input interface 106 by a user (not shown). Here, the control system 100 may be configured to selectively power the heating element 84 at a number of power levels P from a minimum power to a maximum power. At each power increment P, the control system 100 may power the heating element(s) 84 when the thermistor 96 indicates that the temperature in the dehydrating enclosure 820 has fallen below a low temperature set point associated with the particular power level P. The control system 100 then may terminate power to the heating element 84 when the temperature indicated by the thermistor 96 exceeds a high temperature set point associated with the particular power level P. The control system may provide power continuously to the motor 76 during the heating operations regardless of the power level selected. In fact, in exemplary embodiments, the power unit 802 may be the same, or substantially the same, power head 20, described above with respect to a multi-stage counter-top electric oven.

According to an exemplary embodiment, the exemplary power unit 802 may be the NuWave Oven Pro manufactured by Hearthware Home Products of Gurnee, Ill., USA.

In an exemplary embodiment, an exemplary control source may include a processor operable to execute a multi-stage dehydrating process with the power unit, an input interface 160 operable to receive the multi-stage dehydrating process for the power unit and a storage device operable to store the multi-stage dehydrating process in the power unit.

According to an exemplary embodiment, the exemplary input interface 160 may include a button allowing a user to instruct the power unit 802 to dehydrate. In an exemplary embodiment, a user may input a multi-stage dehydration process including a plurality of dehydration temperatures in the exemplary power unit 802.

According to an exemplary embodiment, the power unit 802 may change desired dehydration temperatures during dehydration. In an exemplary embodiment, the power unit 802 may also provide a user one or more notifications regarding dehydration, such as, for example, but not limited to, that a dehydration stage is complete, that a multi-stage dehydration process is complete, that a multi-stage recipe including at least one dehydration stage is complete, or that the position or location of one or more dehydrating trays needs changing, among others.

In an exemplary embodiment, the dehydrating enclosure 820 may include an exemplary adapter 830 (further described in FIG. 26) coupling the power unit 802 with the dehydrating enclosure 820. According to an exemplary embodiment, the dehydrating enclosure 820 may also include a plurality of dehydrating trays 840a, 840b, 840c, 840d (hereinafter collectively referred to as 840, further described in FIG. 24.) In an exemplary embodiment, the dehydrating enclosure 820 may also include an exemplary dehydrating base 850. According to an exemplary embodiment, the dehydrating base 850 may include one or more handles 852a and 852b (hereinafter referred to as 852.) In an exemplary embodiment, the dehydrating base 850 may include one or more exhaust vents (not shown) to allow air to exit the dehydrating enclosure 820. According to an exemplary embodiment, the dehydrating base 850 may include one or more raised feet 854a, 854b and 854c (hereinafter referred to as 854) lifting the dehydrating base 850, which may improve exiting airflow for one or more exhaust vents. According to an exemplary embodiment, at least a portion of the dehydrating enclosure 820 may be composed of, e.g., but not limited to, polypropylene, or other suitable material.

Figure 24:
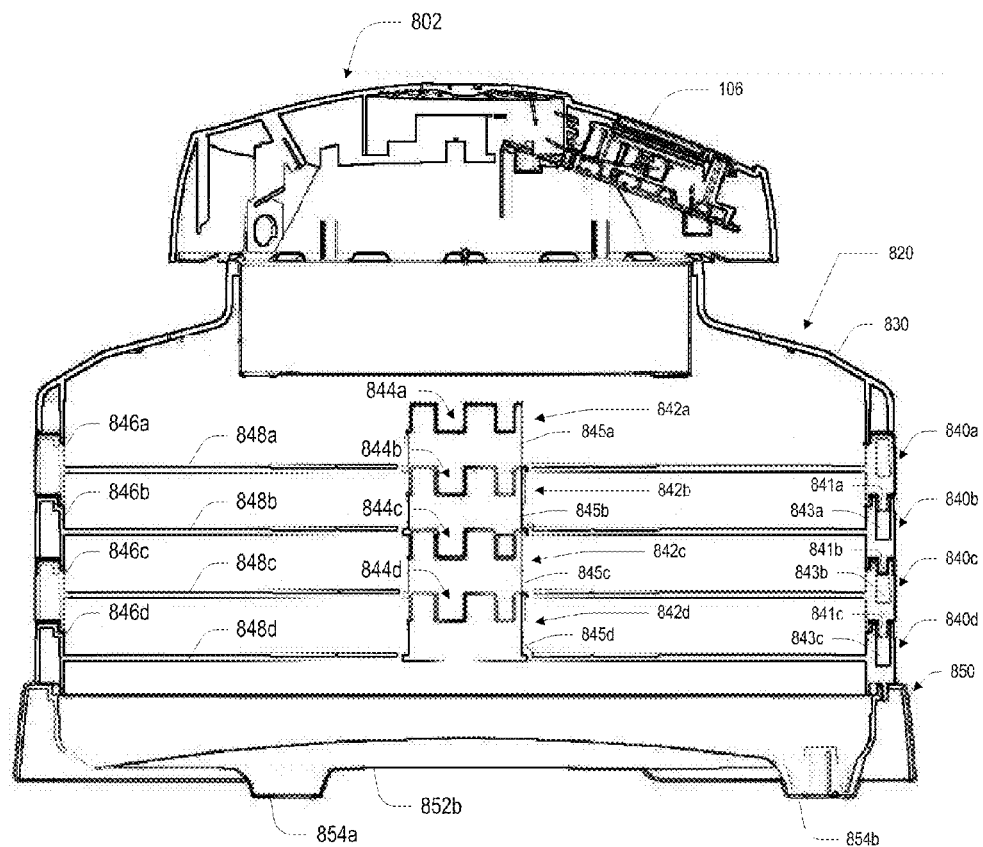
FIG. 24 depicts an exemplary sectional view of an exemplary embodiment of an exemplary dehydrator.

FIG. 24 depicts an exemplary sectional view of an exemplary embodiment of an exemplary dehydrator. According to an exemplary embodiment, a dehydrating tray 840 may support food and permit dehydrating air to circulate within a dehydrating enclosure 820. In an exemplary embodiment, a dehydrating tray 840, from an exemplary top view, may be disc-shaped, or annular in shape, in an exemplary embodiment. According to an exemplary embodiment, a dehydrating tray 840 may include a substantially radial raised outer wall 846a, 846b, 846c, and 846d (hereinafter referred to as 846), a substantially radial raised inner ring 842a, 842b, 842c, and 842d (hereinafter referred to as 842), and a substantially flat inner loop portion 848a, 848b, 848c, and 848d (hereinafter referred to as 848)

In an exemplary embodiment, the outer wall 846 may form the wall of the dehydrating enclosure 820. According to an exemplary embodiment, the outer wall 846 may retain food and may retain dehydrating air within the dehydrating enclosure 820. In an exemplary embodiment, the outer wall 846 may form a plurality of openings 841a, 841b, and 841c (hereinafter collectively referred to as 841) on the top of the wall. According to an exemplary embodiment, the bottom of the wall may include a plurality of latches 843a, 843b, and 843c (hereinafter collectively referred to as 843) operable to lock into the openings 841 in the top of a wall of a lower tray. According to an exemplary embodiment, the openings 841 may be rectangular holes, and the tray 840 may be twisted so that the latches 843 slide into the holes of a lower tray and secure the tray to the lower tray.

In an exemplary embodiment, the substantially radial raised inner ring 842 may be positioned in a center portion of the outer wall 846. According to an exemplary embodiment, the substantially radial raised inner ring 842 may circulate dehydrating air down and across a dehydrating tray 840. According to an exemplary embodiment, the inner ring may be fixedly and detachably mountable to a second dehydrating tray positioned on top thereof. In an exemplary embodiment, the inner ring may include a substantially vertical wall 845 forming one or more spaces 844 circulating dehydrating air between a central portion of the dehydrating tray and an orifice defined by the substantially vertical wall 845 and through which dehydrating air may be blown downward from the power unit 802.

According to an exemplary embodiment, the substantially flat radial inner loop 848 may include plurality of surfaces and form a plurality of openings. In an exemplary embodiment, the surfaces may support items to be dehydrated and the openings may permit air to pass through the tray 840. In an exemplary embodiment, air may be drawn in from the outside by a power unit 802. According to an exemplary embodiment, the air may then be heated by the power unit 802 and directed down through the raised inner ring 842 of at least one dehydrating tray. In an exemplary embodiment, the heated air may exit the rings 842 through spaces 844 in the rings. According to an exemplary embodiment, the heated air may pass through the substantially flat radial inner loop 848 of at least one dehydrating tray. In an exemplary embodiment, the heated air carrying moisture from articles being dehydrated may exit the cooking enclosure through one or more exhaust vents in a dehydrating base 850.

In an exemplary embodiment, the dehydrating trays 840 may be stackable. According to an exemplary embodiment, the dehydrating enclosure 820 may include one or more additional dehydrating trays respectively stacked on top of one another. According to an exemplary embodiment, the dehydrating enclosure 820 may be modular and the dehydrating trays 840 may be interchanged. In an exemplary embodiment, the dehydrating trays 840 may be identical.

FIG. 25 depicts an exemplary, substantially circular, top view of an exemplary embodiment of an exemplary dehydrator. In an exemplary embodiment, the multi-stage counter-top electric oven power unit 802 may be on top, with an adapter 830 immediately below, followed by at least one dehydrating tray 840, and ending on the bottom with a base 850.

Figure 26:
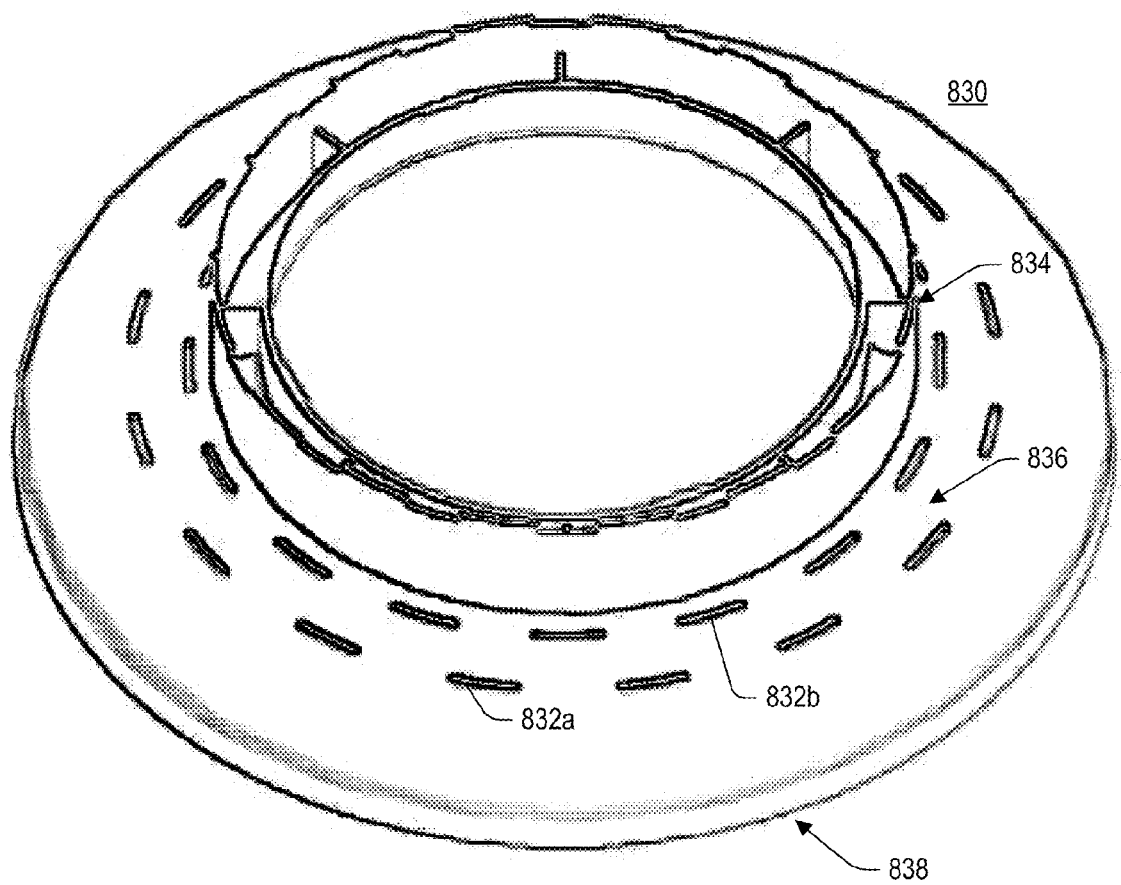
FIG. 26 depicts an exemplary perspective view of an exemplary embodiment of an exemplary adapter for an exemplary dehydrator.

FIG. 26 depicts an exemplary perspective view of an exemplary embodiment of an exemplary adapter 830 for an exemplary dehydrator. In an exemplary embodiment, the adapter 830 may couple the power unit 802 to a dehydrating tray 840. According to an exemplary embodiment, the adapter 830 may include an exemplary bottom portion 838 adapted to couple with a dehydrating tray 840 and an exemplary top portion 834 adapted to couple with a power unit 802. In an exemplary embodiment, the adapter 830 may also include an exemplary middle portion 836. According to an exemplary embodiment, the middle portion 836 may include at least one exemplary concentric row of a plurality of vents 832a and 832b (hereinafter referred to as 832.) In an exemplary embodiment, the vents 832 may exhaust air from the dehydrating enclosure 820. According to an exemplary embodiment, the vents 832 may be inch long slits in a circular pattern around the adapter 830.

Figure 27:
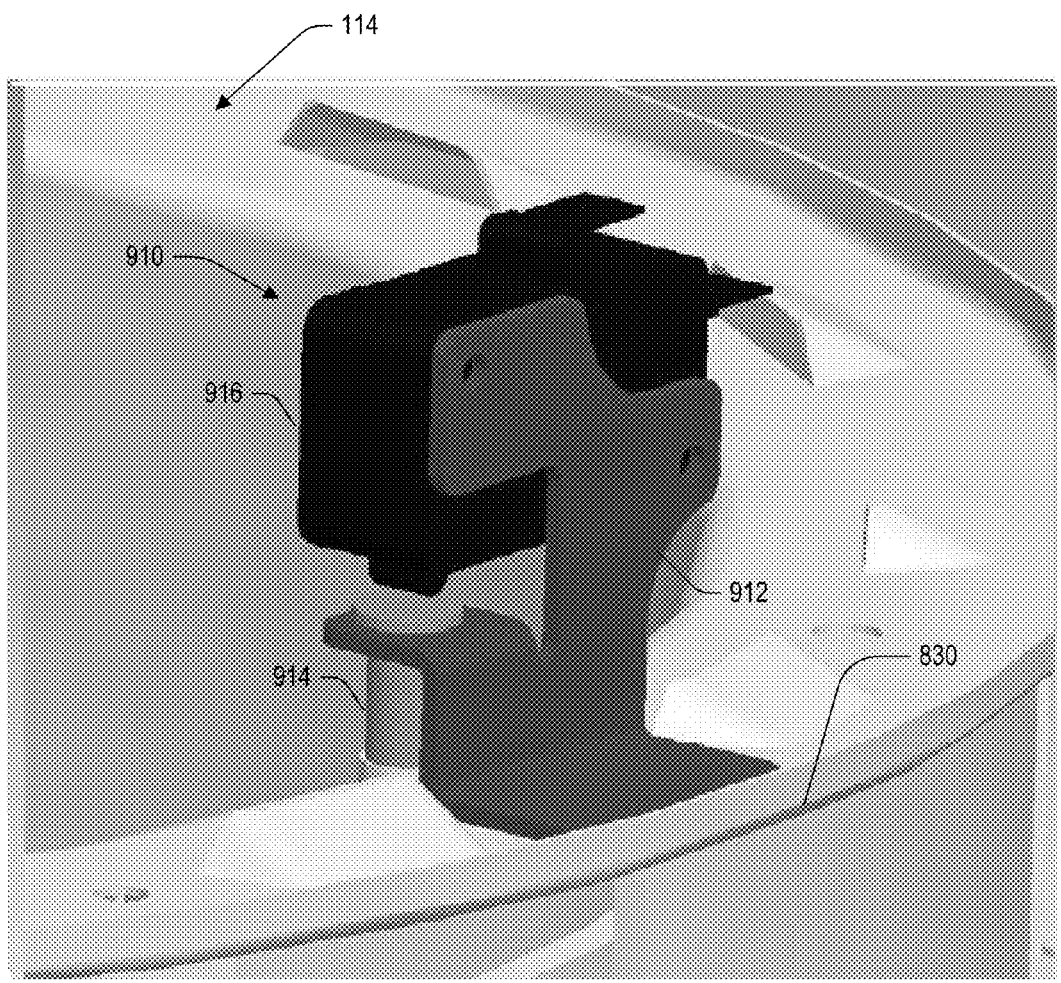
FIG. 27 depicts an exemplary perspective view of an exemplary embodiment of an exemplary sensor for an exemplary power unit.

FIG. 27 depicts an exemplary perspective view of an exemplary embodiment of an exemplary sensor 910 for an exemplary power unit 802. In an exemplary embodiment, the power unit 802 may include a sensor 910. According to an exemplary embodiment, the sensor 910 may detect if the power unit 802 is attached to a dehydrating enclosure 820 or a cooking enclosure. In an exemplary embodiment, the detection process may determine an activation status of a switch, wherein the activation status includes at least a first status if the power unit is coupled with the dehydrating enclosure and a second status if the power unit is not coupled with the dehydrating enclosure. In an exemplary embodiment, the activation status may include a status for when the power unit is coupled with the cooking enclosure.

According to an exemplary embodiment, the power unit 802 may include safety features for dehydration, such as, e.g., but not limited to, the control source limiting the maximum desired temperature of the dehydrating enclosure when the power unit is detected to be coupled with a dehydrating enclosure. In an exemplary embodiment, the melting temperature of the dehydrating enclosure 820 may be lower than the maximum temperature capable of being produced by the power unit 802. According to an exemplary embodiment, the maximum temperature the power unit 802 may be capable of producing may be 550° F. degrees.

In an exemplary embodiment, the switch 910 may include an exemplary stand 912, an exemplary actuator 914, an exemplary actuator sensor 916. In an exemplary embodiment, the actuator 914 may be a column flanged on one end and threaded through a portion of the stand 912. According to an exemplary embodiment, the actuator sensor 916 may be coupled to the stand 912 such that the actuator 914 may trigger the actuator sensor 906. In an exemplary embodiment, the stand 912 may be coupled, such as e.g., but not limited to, spot welding, with a portion of a power unit 802, such as, e.g., but not limited to, the cooling manifold 114 of a power unit.

Figure 28A:
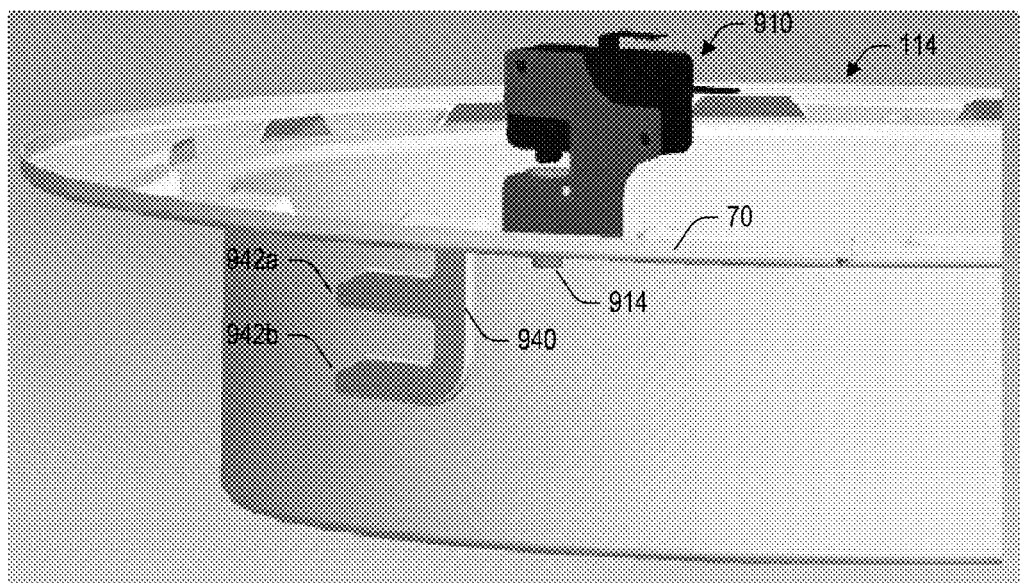
FIGS. 28A-B depict exemplary side views of an exemplary embodiment of an exemplary sensor coupling with an exemplary dehydrating enclosure.
Figure 28B:
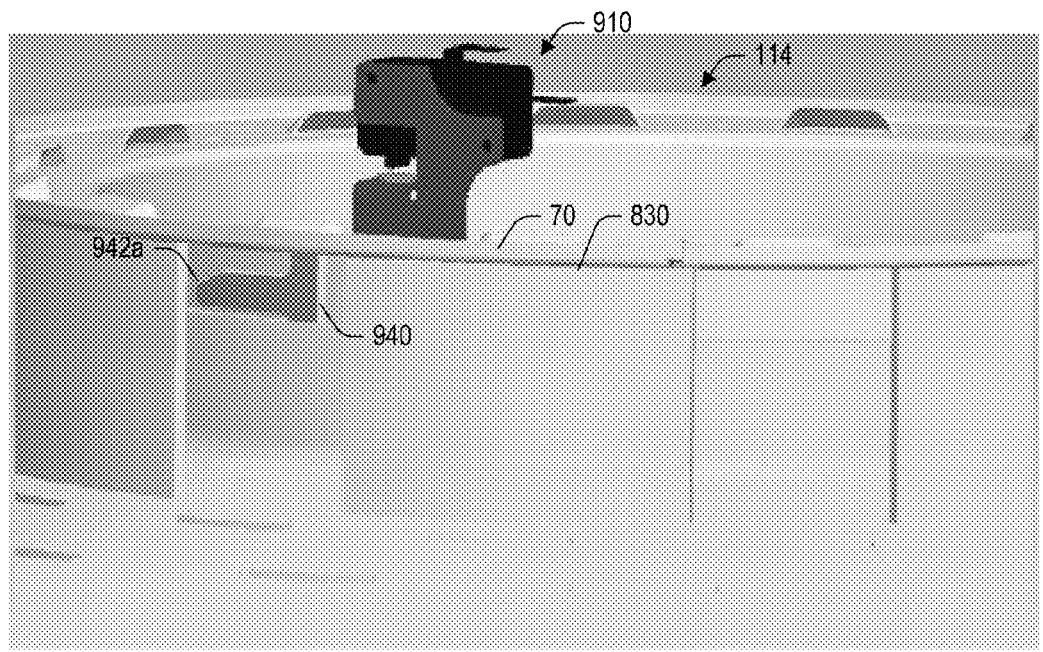

FIGS. 28A-B depict exemplary side views of an exemplary embodiment of an exemplary switch coupling with an exemplary dehydrating enclosure 820. In an exemplary embodiment, when a power unit 802 is coupled to a dehydrating enclosure 820, the adapter 830 may avoid the actuator 914 so as not to trigger an actuator sensor 916. According to an exemplary embodiment, the actuator 914 of the switch 910 may extend past a cooling manifold flange 70. According to an exemplary embodiment, a power unit 802 may also include a lock 940 securing the power unit 802 to a dehydrating enclosure 820. In an exemplary embodiment, a lock 940 may be two horizontally oriented prongs 942a and 942b between which a tab (not shown) on the adapter of the dehydrating enclosure 820 may be secured.

Figure 29A:
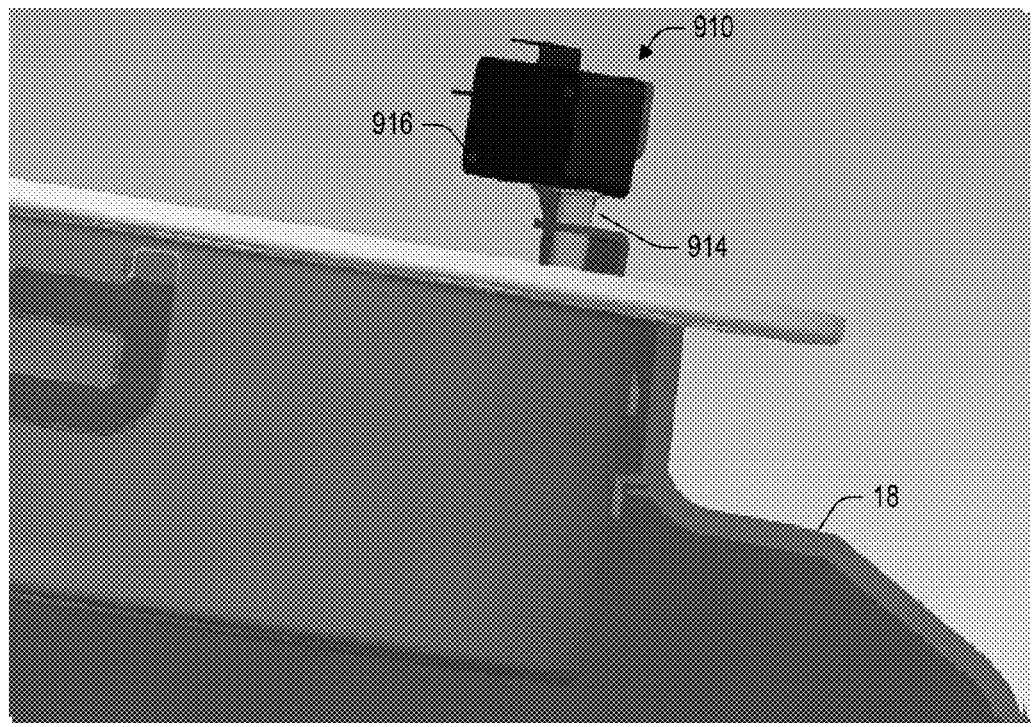
FIGS. 29A-B depict exemplary perspective views of an exemplary embodiment of an exemplary sensor coupled with an exemplary cooking enclosure.
Figure 29B:
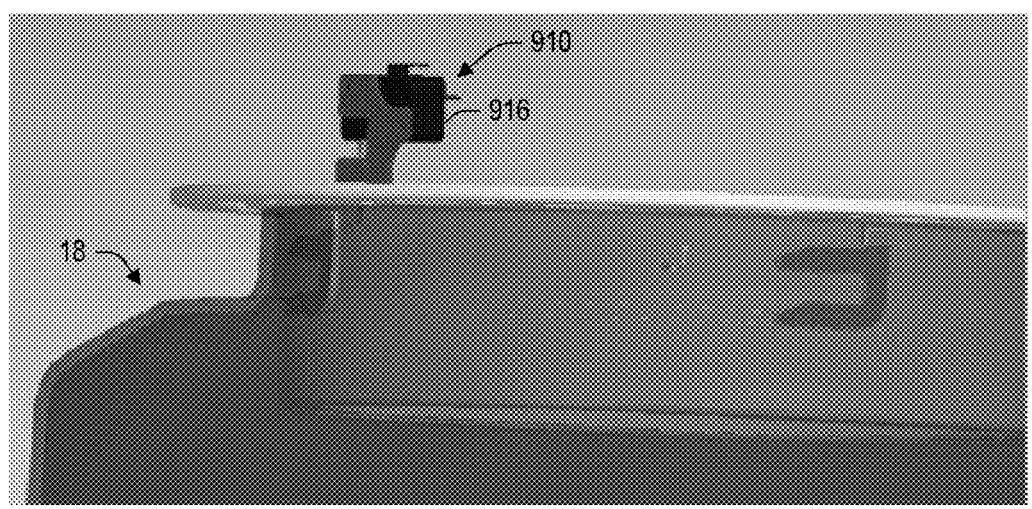

FIGS. 29A-B depict exemplary perspective views of an exemplary embodiment of an exemplary switch coupled with an exemplary cooking enclosure. According to an exemplary embodiment, the power unit 802 may be coupled with a cooking enclosure 21, and may cause a switch actuator 914 to trigger an actuator sensor 916. In an exemplary embodiment, the opposite may be true, coupling the power unit 802 to the cooking enclosure 21 may not trigger the switch sensor 916, but coupling the power unit 802 to a dehydrating enclosure 820 may trigger the switch sensor 916.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A power unit, comprising:
a power supply disposed inside the power unit adapted to be coupled to a power source; and
a controller operable to control the power supply,
the power unit being alternatively detachably couplable to either one of both: cooking enclosure, and a dehydrating enclosure,
wherein the power unit comprises:
a sensor, coupled to said controller, operable to determine whether the power unit is coupled to either one of both of:
the cooking enclosure; and
the dehydrating enclosure.

2. The power unit according to claim 1, wherein the power unit comprises a power head.

3. The power unit according to claim 1, wherein the power supply comprises:
a heating unit coupled to said controller; and
a fan unit coupled to said controller.

4. The power unit according to claim 3, wherein said heating unit comprises:
a heating element coupled to said controller, operable to provide heat to a given one alternatively detachably couplable enclosure, said enclosure comprising at any given time, any one of both of the cooking enclosure and the dehydrating enclosure; and
at least one thermostat system, coupled to said controller, operable to measure an internal temperature of said enclosure and to provide the internal temperature measured as an input to said controller.

5. The power unit according to claim 4, wherein said at least one thermostat system comprises at least one of:
a thermister, coupled to said controller, operable to measure the internal temperature of said enclosure; or
a thermostat, coupled to said controller, adjustable to set a desired temperature of said enclosure.

6. The power unit according to claim 3, wherein said fan unit comprises:
a fan chamber;
a fan mounted in said fan chamber operable to create a dehydrating air flow throughout any one of: the cooking enclosure or the dehydrating enclosure.

7. The power unit according to claim 1, wherein the controller limits a maximum desired temperature of the dehydrating enclosure when the power unit is coupled with said dehydrating enclosure, wherein a maximum temperature of the dehydrating enclosure is less than a maximum temperature of the cooking enclosure.

8. The power unit according to claim 1, wherein said sensor comprises a switch with both a first activation status when the power unit is coupled with the cooking enclosure, and a second activation status when the power unit is coupled with the dehydrating enclosure.

9. The power unit according to claim 8, wherein said switch comprises
an actuator sensor communicatively coupled to said controller; and
an actuator coupled to at least one of the power unit or a portion of said enclosures;
wherein said actuator is adapted to trigger said actuator sensor,
wherein said actuator sensor being adapted to determine whether either of the cooking enclosure or the dehydrating enclosure is coupled to the power unit, and
wherein said actuator sensor, if such coupling is determined, is adapted to determine which of either of the cooking enclosure and the dehydrating enclosure is coupled to the power unit, and is adapted to provide to said controller said determination of which of the enclosures is coupled to the power unit.

10. The power unit according to claim 9, wherein the power unit is coupled to the cooking enclosure, and wherein the controller comprises:
an input interface operable to receive a multi-stage cooking recipe;
a storage device operable to store the multi-stage cooking recipe; and
a processor operable to execute the multi-stage cooking recipe operable to control said power supply.

11. The power unit according to claim 1, wherein the power unit and the cooking enclosure collectively comprise a multi-stage counter-top electric oven.

12. The power unit according to claim 1, wherein the power unit and the dehydrating enclosure collectively comprise a dehydrator.

13. The power unit according to claim 12, wherein said controller comprises:
an input interface operable to receive a multi-stage dehydration process;
a storage device operable to store the multi-stage dehydration process; and
a processor operable to cause the power supply to execute the multi-stage dehydration process.

14. The power unit according to claim 13, wherein the controller is operable to notify a user to change the position of at least one dehydrating tray comprising the dehydrating enclosure.

15. A dehydrating unit, comprising:
a dehydrating enclosure comprising:
an upper annular top surface cover portion comprising:
a circular opening at a center of said upper annular top surface cover portion, and
a plurality of opening vents arranged about a concentric circle in said upper annular top surface cover portion for allowing air flow through said upper annular top surface cover portion of said dehydrating enclosure; and
a plurality of dehydrating trays,
wherein each of said plurality of dehydrating trays are adapted to be stacked on top of one another;
wherein each of said plurality of dehydrating trays comprises:
an annular shaped top portion comprising an outer raised circular wall,
a plurality of holes in at least one surface of each of said dehydrating trays, and
a plurality of latches on each of said plurality of said dehydrating trays,
wherein said plurality of latches of a first of said plurality of said dehydrating trays is adapted to interlock with said plurality of holes of a second of said plurality of said dehydrating trays;
an inner raised wall concentric to said outer raised circular wall,
wherein said inner raised wall comprises:
plurality of openings allowing airflow from an inner opening through the inner raised wall to a tray portion of a given one of said plurality of said dehydrating trays; and a plurality of radial bottom tray portions with at least one surface to support any foodstuff to be dehydrated, and wherein between a given pair of said plurality of said radial bottom tray portions comprises an opening operative to allow vertical air flow between said given pair of said plurality of said radial bottom tray portions;

a base comprising at least one opening operable to allow dehydrating airflow through said base, and at least one handle operable to lift the dehydrating unit; and a power unit, comprising:

a power supply disposed inside the power unit adapted to be coupled to a power supply; and a controller operable to control said power supply, said power unit being alternatively detachably couplable to either of both: said dehydrating enclosure, and a cooking enclosure, wherein the control source comprises a sensor operable to determine whether said power unit is coupled to the cooking enclosure or said dehydrating enclosure.

16. The dehydrating unit according to claim 15, further comprising an adapter operable to detachably couple the power unit and said dehydrating enclosure.

17. A dehydrating device, comprising:

a dehydrating enclosure comprising:

an upper annular top surface cover portion comprising a circular opening at a center of said upper annular top surface cover portion to receive the power unit, and a plurality of opening vents arranged about said upper annular top surface cover portion for allowing air flow through said upper annular top surface cover portion of said dehydrating enclosure; and a plurality of dehydrating trays, wherein each of said plurality of dehydrating trays are adapted to be stacked on top of one another;

wherein each of said plurality of dehydrating trays comprises:

an annular top portion comprising an outer raised double walled circular wall, wherein said outer raised double walled circular wall comprises:

a plurality of holes in at least one surface, and a plurality of latches in at least one surface, wherein said plurality of latches of a first of said plurality of said dehydrating trays is adapted to interlock with said plurality of holes of a second of said plurality of said dehydrating trays;

an inner raised wall concentric to said outer raised double walled circular wall, wherein said inner raised wall comprises:

a plurality of openings allowing airflow from an inner opening through the inner raised wall to a tray portion of a given one of said plurality of said dehydrating trays; and a plurality of radial bottom tray portions comprising at least one surface for supporting any foodstuff to be dehydrated, and wherein a given pair of said plurality of said radial bottom tray portions having openings therebetween to allow air flow vertically therethrough; and an adapter operable to removably couple said dehydrating enclosure to a power unit, said power unit comprising:

a power supply disposed inside said power unit, said power supply adapted to be coupled to a power source; and a controller operable to control said power supply, said power unit being alternatively detachably couplable by at a least a portion of said power unit to either of both: said dehydrating enclosure, and a cooking enclosure, wherein the controller comprises a sensor operable to determine whether the power unit is coupled to the cooking enclosure or said dehydrating enclosure.

18. The dehydrating device according to claim 17, wherein a first of said plurality of said dehydrating trays comprises:

a substantially circular raised outer wall, the wall forming said plurality of openings on a top portion thereof, and the wall comprising said plurality of latches on a bottom portion thereof, said latches operable to couple with one or more of said openings on the top portion of a second dehydrating tray of said plurality of dehydrating trays positioned below said first of said dehydrating trays.

19. The dehydrating device according to claim 17, wherein each of said plurality of said dehydrating trays forms a substantially circular raised ring positioned in a portion of the said dehydrating tray, the raised ring being fixedly and detachably mountable to a second dehydrating tray positioned on top thereof.

20. The dehydrating device according to claim 19, wherein the raised ring comprises a substantially vertical wall comprising a plurality of openings to allow airflow, and forming one or more spaces circulating dehydrating air between a vertical orifice portion of said each of said plurality of said dehydrating trays and a tray portion, and said orifice defined by the substantially vertical wall and through which orifice dehydrating air is blown downward from, or drawn upward through, the power unit.

21. A method, comprising:

sensing, by at least one controller of a power unit, a determination of which of at least two alternatively detachably couplable enclosures are coupled to the power unit, wherein at least one of said enclosures comprises a dehydrating enclosure comprising:

an upper annular top surface cover portion comprising an opening of said upper annular top surface cover portion in which to receive the power unit, and a plurality of opening vents arranged about the opening in said upper annular top surface cover portion for allowing air flow through said upper annular top surface cover portion of said dehydrating enclosure; and a plurality of dehydrating trays, wherein each of said plurality of dehydrating trays are adapted to be stacked on top of one another;

wherein each of said plurality of dehydrating trays comprises:

an annular top comprising an outer raised double walled circular wall, a plurality of holes in at least one surface of said dehydrating tray, and a plurality of latches in at least one surface of said dehydrating tray, wherein said plurality of latches of a first of said plurality of said dehydrating trays is adapted to interlock with said plurality of holes of a second of said plurality of said dehydrating trays;

an inner raised wall concentric to said outer raised double walled circular wall, wherein said inner raised wall comprises:

a plurality of openings allowing airflow vertically between respective adjacent pairs of said plurality of said dehydrating trays from an inner opening through the inner raised concentric wall to a tray portion of a given one of said plurality of said dehydrating trays; and a plurality of radial bottom tray portions having at least one surface and having at least one opening between a given pair of said radial bottom tray portions allowing vertical air movement through said bottom tray portion; and controlling a power supply of the power unit based on said sensing.

22. A method, comprising:

controlling, by at least one controller of a power unit, operation of the power unit; and sensing, by at least one sensor of the power unit, a state of combining the power unit with at least one of a plurality of enclosures, wherein said plurality of enclosures comprises:

a dehydrating enclosure comprising:

an upper annular top surface cover portion comprising a circular opening adapted to receive the power unit, and a plurality of opening vents arranged about said circular opening in said upper annular top surface cover for allowing air flow through said upper annular top surface cover portion of said dehydrating enclosure; and a plurality of dehydrating trays, wherein each of said plurality of dehydrating trays are stacked on top of one another;

wherein each of said plurality of dehydrating trays comprises:

an annular top comprising an outer circular wall, wherein said outer circular wall comprises:

a vertical surface for directing airflow, a plurality of holes in at least one surface of said dehydrating tray, and a plurality of latches in at least one surface of said dehydrating tray, wherein said plurality of latches of a first of said plurality of said dehydrating trays is adapted to interlock with said plurality of holes of a second of said plurality of said dehydrating trays;

a horizontal tray portion coupled to said outer circular wall, said horizontal tray portion comprising:

a plurality of radial portions in said horizontal tray portion operable to allow airflow vertically through said horizontal tray portion with a plurality of surfaces having openings therebetween;

an inner wall, coupled to an inner portion of said horizontal tray portion, said inner wall comprising:

a vertical wall, and a plurality of openings in said vertical wall allowing airflow through said vertical wall to said horizontal tray portion of a given one of said plurality of said dehydrating trays.

23. The power unit according to claim 1, wherein the controller is operable to set at least one temperature setting devised for removal of bacteria without elimination of vital enzymes.

24. The power unit according to claim 23, wherein the at least one temperature setting comprises at least one of: 106° F., 116° F., 150° F., 175° F., 225° F., 250° F., 275° F., 300° F., 325° F., or 350° F.

25. A system comprising the power unit according to claim 1, and further comprising:

a dehydrating enclosure, wherein said dehydrating enclosure comprises:

an upper annular top surface cover portion comprising:

an opening through which to receive the power unit, and a plurality of opening vents arranged about a top surface of said upper annular cover portion adapted to allow air flow through said upper annular top surface cover portion of said dehydrating enclosure; and a plurality of dehydrating trays, wherein each of said plurality of dehydrating trays is adapted to be stacked on top of another of said plurality of dehydrating trays;

wherein each of said plurality of dehydrating trays comprises:

a plurality of holes in at least one surface of said dehydrating tray;

a plurality of latches in at least one surface of said dehydrating tray;

wherein said plurality of latches of a first of said plurality of said dehydrating trays is adapted to interlock with said plurality of holes of a second of said plurality of said dehydrating trays;

an outer wall;

an inner wall comprising a plurality of first openings; and a horizontal tray portion comprising:

a plurality of radial bottom tray portions with at least one surface to support foodstuff to be dehydrated; and wherein each pair of said plurality of radial bottom tray portions comprises a second opening formed therebetween; and wherein said first plurality of openings allow airflow through said inner wall, and wherein said second opening allows airflow through said horizontal tray portion.

* * * * *